US008305627B2

(12) United States Patent
Ikeda

(10) Patent No.: US 8,305,627 B2
(45) Date of Patent: Nov. 6, 2012

(54) IMAGE FORMING APPARATUS, MISREGISTRATION CORRECTION CONTROL METHOD AND COMPUTER-READABLE INFORMATION RECORDING MEDIUM

(75) Inventor: Hiroaki Ikeda, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 928 days.

(21) Appl. No.: 12/390,554

(22) Filed: Feb. 23, 2009

(65) Prior Publication Data

US 2009/0213399 A1 Aug. 27, 2009

(30) Foreign Application Priority Data

Feb. 25, 2008 (JP) ................................ 2008-042950
Jan. 22, 2009 (JP) ................................ 2009-011934

(51) Int. Cl.
*G06F 15/00* (2006.01)
*G06K 1/00* (2006.01)
*G06K 15/00* (2006.01)
*G06K 15/22* (2006.01)

(52) U.S. Cl. ........................................ 358/1.18; 358/1.4

(58) Field of Classification Search ......................... None
See application file for complete search history.

(56) References Cited

U.S. PATENT DOCUMENTS 6,226,460 B1 5/2001 Hino et al.
7,778,579 B2 * 8/2010 Ueda et al. .................... 399/301
8,107,833 B2 * 1/2012 Yoshida .......................... 399/44
2006/0139433 A1 6/2006 Yoshida
2007/0177912 A1 8/2007 Ikeda
2008/0043299 A1 2/2008 Ikeda
2008/0273907 A1 11/2008 Ikeda

FOREIGN PATENT DOCUMENTS

JP 2000-241867 9/2000
JP 2002-162805 6/2002
JP 2002-341699 11/2002
JP 2003-280813 9/2003
JP 2006-215524 8/2006
JP 2007-293047 11/2007
JP 2008-033062 2/2008

* cited by examiner

*Primary Examiner* — Douglas Tran
(74) *Attorney, Agent, or Firm* — IPUSA, PLLC

(57) ABSTRACT

A pattern image of either a registration correction pattern including a plurality of position detecting marks or a misregistration correction performing determination pattern having a plurality of position detecting marks, the number of which marks is smaller than that of the registration correction pattern image is formed. A misregistration amount is calculated based on an image formed position detected with the use of the pattern image. It is determined whether the registration correction is to be carried out, based on the misregistration amount with the use of an image formed position of the correction performing determination pattern. When it is determined to carry out the misregistration correction, the misregistration correction is carried out based on the misregistration amount with the use of image formed positions of the misregistration correction pattern.

18 Claims, 12 Drawing Sheets

IMAGE FORMING APPARATUS, MISREGISTRATION CORRECTION CONTROL METHOD AND COMPUTER-READABLE INFORMATION RECORDING MEDIUM

BACKGROUND OF THE INVENTION

1. Field of the Invention

The present invention relates to an image forming apparatus which provides an image which is visualized as a result of a plurality of colors being overlaid together, in an electrophotographic printer or such. In particular, the present invention relates to an art of forming misregistration correction patterns, and detecting the thus-formed misregistration correction patterns, to carry out misregistration correction.

2. Description of the Related Art

In a tandem-type image forming apparatus, toner images of respective colors (for example, respective expression colors such as black (BK), cyan (C), magenta (M) and yellow (Y)) are formed by different image forming parts. The toner images are then overlaid together and a color image is formed.

In such an image forming apparatus, a stable color image may not be obtained (i.e., so-called color shifts may occur) when positions (i.e., image formed positions) of toner images of respective colors being overlaid together shift from each other. Therefore, in an image forming apparatus in the related art, a misregistration correction pattern is formed for each color, a pattern detecting part is used to detect a position of the misregistration correction pattern of each color, and misregistration correction is performed. In this image forming apparatus, an adjustment is carried out in such a manner that the misregistration patterns of the respective colors may be overlaid at the same position. As a result, in the image forming apparatus in the related art, color shifts caused by misregistration can be reduced, and thus a stable color image (i.e., a high-quality color image) can be formed.

However, in the image forming apparatus in the related art, after a certain time has elapsed from a time of misregistration correction being carried out, misregistration may occur again for various reasons. Therefore, in the image forming apparatus in the related art, misregistration correction should be carried out periodically.

It is noted that, a certain amount of toner is consumed for misregistration correction other than image forming operation which his actually desired by a user.

Causes of misregistration may be, for example, a change in a photosensitive characteristic, a change in an operation environment, and in particular, a change in an electrostatic characteristic. Therefore, a frequency of carrying out misregistration correction depends on a change of conditions such as an operating condition of an image forming apparatus, an installation condition of the image forming apparatus, or such. Therefore, in some cases, misregistration correction may be carried out frequently, and thereby, toner consumption may increase, which causes a disadvantage for a user.

Further, when a printing request is given during misregistration correction being carried out, an extra time is required until the required printing is finished. When misregistration correction is carried out frequently, a time required for carrying out the misregistration correction may constitute a down time, and may adversely affect the usability of the image forming apparatus. Further, such a down time may occur also when power supply is started in the image forming apparatus, and thereby, a time delay may be required before the required printing can be started.

In contrast thereto, Japanese Laid-Open Patent Application No. 2002-162805 for example discusses, an image forming apparatus in which, when misregistration correction for a sub-scan direction and a main scan direction is carried out, the number of misregistration correction patterns to be formed for each color for each scan direction is made different, a misregistration amount is calculated based on a position of each pattern, and correction is carried out. In this image forming apparatus, correction is regularly carried out based on the detection results of misregistration correction pattern positions for the entire length of a conveyance belt or an intermediate transfer belt, whereas, when continuous printing is carried out, correction is carried out based on a predetermined number of pattern positions.

Japanese Laid-Open Patent Application No. 2006-215524 discusses an image forming apparatus in which, as misregistration correction pattern image data, fine adjustment patterns (i.e., patterns used for fine correction) and coarse adjustment patterns (i.e., patterns for rough correction) are provided separately. Then, according to a condition at a time of correction, either type of the patterns is used for misregistration correction. That is, in the image forming apparatus, when a misregistration amount beyond a range of fine adjustment is calculated (i.e., a calculated misregistration amount is so large), misregistration correction patterns used for misregistration correction are changed from the fine adjustment patterns into the coarse adjustment patterns.

However, in these image forming apparatuses in the related art, the above-mentioned problems may not be completely solved.

SUMMARY OF THE INVENTION

In order to reduce a toner consumption or a down time required for misregistration correction, it is desirable that the image forming apparatus have a configuration for which misregistration correction is carried out only in a case where misregistration correction is necessary, i.e., only in such as a case for which an amount of color shifts is so large that an output color image may be adversely affected.

In the present invention, it is an object to provide an image forming apparatus, a misregistration correction control method and a computer-readable information recording medium storing a misregistration correction control program, in which, in consideration of the problems in the related art, such control is carried out that, correction is carried out based on a determination result as to whether misregistration correction should be carried out, and further, correction is carried out, according to an operating condition, in such timing that, even when misregistration correction is carried out, a down time does not occur. Thereby, a down time and a toner consumption occurring due to misregistration correction can be reduced, the usability of the image forming apparatus is kept undegraded, and a stable color image can be formed.

In order to achieve the object, an image forming apparatus according to the present invention, which carries out misregistration correction for image formed positions of a plurality of colors, with the use of misregistration correction patterns, includes a pattern forming part configured to form a pattern image of either misregistration correction patterns including a plurality of position detecting marks or misregistration correction performing determination patterns having a plurality of position detecting marks, the number of which marks is smaller than that of the misregistration correction pattern image; a misregistration amount calculating part configured to calculate a misregistration amount based on an image formed position detected with the use of the pattern image formed by the pattern forming part; a correction performing determination part configured to determine whether the misregistration correction is to be carried out, based on the misregistration amount calculated by the misregistration amount calculating part; and a correcting part configured to carry out misregistration correction based on a determination result of the correction performing determination part, wherein the correction performing determination part determines whether the misregistration correction is to be carried out based on the misregistration amount calculated by the misregistration amount calculation part with the use of image formed positions of the misregistration correction performing determination patterns formed by the pattern forming part, and, when the correction performing determination part has determined to carry out misregistration correction, the correcting part carries out misregistration correction based on the misregistration amount calculated by the misregistration amount calculating part with the use of image formed positions of the misregistration correcting patterns formed by the pattern forming part.

Other objects, features and advantages of the present invention will become more apparent from the following detailed description when read in conjunction with the accompanying drawings.

DETAILED DESCRIPTION OF THE PREFERRED EMBODIMENTS

Figure 1:
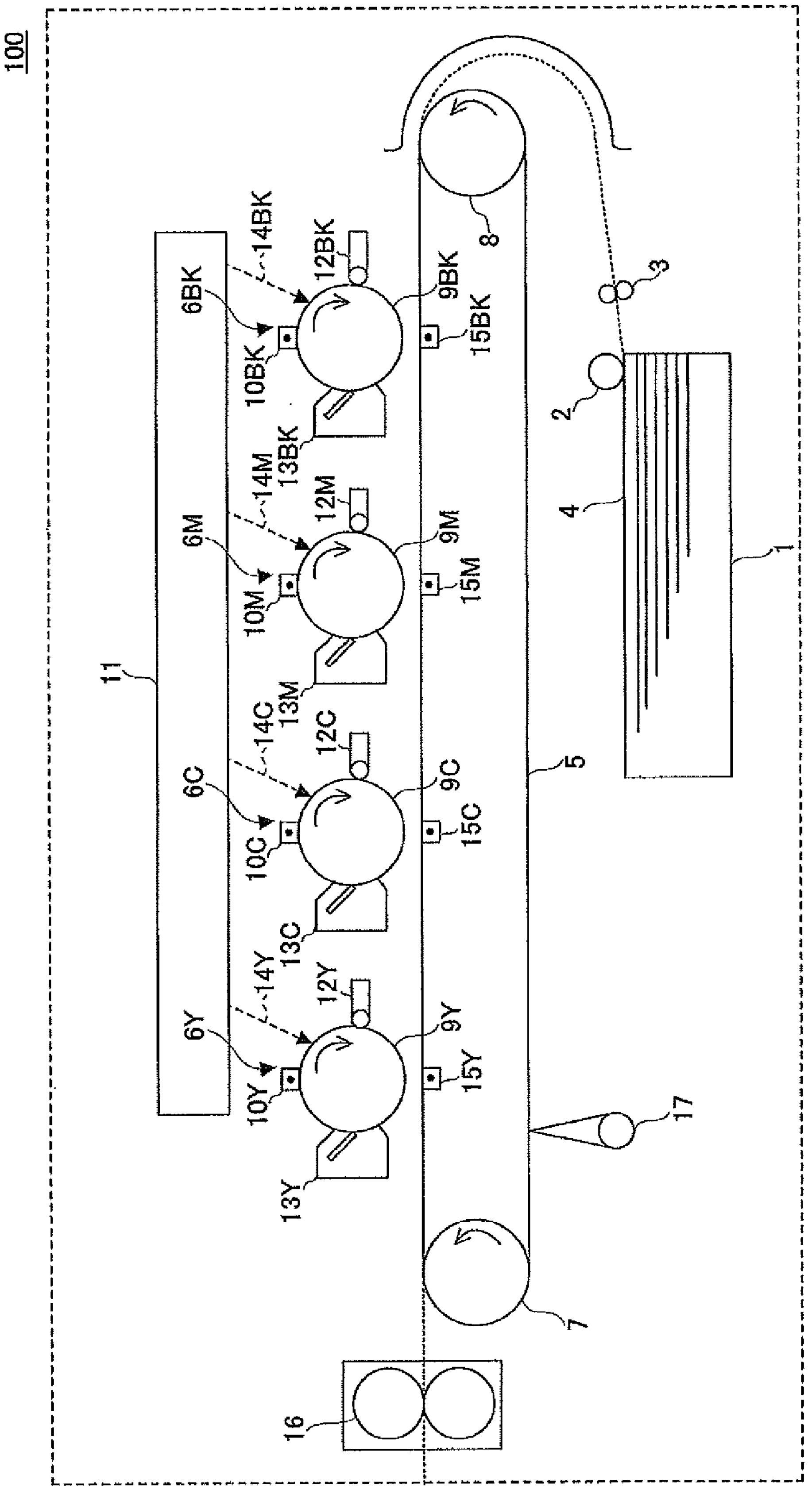
FIG. 1 depicts a hardware configuration example of an image forming apparatus in a first embodiment of the present invention.

According to an embodiment, an image forming apparatus which carries out misregistration correction for an image formed position of a plurality of colors with the use of misregistration correction patterns, includes a pattern forming part configured to form a pattern image of either misregistration correction patterns including a plurality of position detecting marks or misregistration correction performing determination patterns having a plurality of position detecting marks, the number of which marks is smaller than that of the misregistration correction patterns; a misregistration amount calculating part configured to calculate a misregistration amount based on an image formed position detected with the use of the pattern image formed by the pattern forming part; a correction performing determination part configured to determine whether the misregistration correction is to be carried out, based on the misregistration amount calculated by the misregistration amount calculating part; and a correcting part configured to carry out misregistration correction based on a determination result of the correction performing determination part, wherein the correction performing determination part determines whether misregistration correction is to be carried out based on the misregistration amount calculated by the misregistration amount calculation part with the use of image formed positions of the misregistration correction performing determination patterns formed by the pattern forming part, and, when the correction performing determination part has determined to carry out misregistration correction, the correcting part carries out misregistration correction based on the misregistration amount calculated by the misregistration amount collecting part with the use of image formed positions of the misregistration correcting patterns formed by the pattern forming part.

In this image forming apparatus according to the embodiment, when image forming operation enters a predetermined operating condition, toner mark patterns in performing determination patterns are formed, and an image detecting part detects toner marks. Then, a misregistration amount is calculated based on an image formed position calculated from the detection result, and it is determined whether misregistration correction should be carried out based on the thus-calculated misregistration amount. Then, when it is determined that misregistration correction should be carried out, toner mark patterns of correction patterns are formed, and the image detecting part detects toner marks thereof. Then, based on an image formed position calculated from the detection result, a misregistration amount is calculated, and correction is carried out based on the calculated misregistration amount.

Thereby, in the image forming apparatus according to the embodiment, a down time and a toner consumption occurring due to misregistration correction can be reduced, the usability of the image forming apparatus is kept undegraded, and a stable color image can be formed.

In order to achieve the above-mentioned object, a misregistration correction control method according to an embodiment, in an image forming apparatus which carries out misregistration correction for an image formed position of a plurality of colors, with the use of misregistration correction patterns, includes a pattern forming step of forming a pattern image of either misregistration correction patterns including a plurality of position detecting marks or misregistration correction performing determination patterns having a plurality of position detecting marks, the number of which marks is smaller than that of the misregistration correction pattern image; a misregistration amount calculating step of calculating a misregistration amount based on an image formed position detected with the use of the pattern image formed in the pattern forming step; a correction performing determination step of determining whether the registration correction is to be carried out based on the misregistration amount calculated in the misregistration amount calculating step with the use of image formed positions of the correction performing determination patterns formed in the pattern forming step; and a correcting step of, when it is determined in the correction performing determination step to carry out misregistration correction, carrying out misregistration correction based on the misregistration amount calculated in the misregistration amount calculating step with the use of image formed positions of the misregistration correction patterns formed in the pattern forming step.

According to the misregistration correction control method, the image forming apparatus is controlled in such a manner that, correction is carried out based on a determination result as to whether misregistration correction should be carried out, and correction is carried out according to an operating condition in such timing that, even when misregistration correction is carried out, a down time does not occur.

Thereby, in the misregistration correction control method according to the embodiment, such an image forming apparatus can be realized, that, a down time and a toner consumption occurring from misregistration correction can be reduced, the usability of the image forming apparatus is kept undegraded, and a stable color image can be formed.

In order to achieve the above-mentioned object, a computer-readable information recording medium according to an embodiment, which embodies a misregistration correction control program which, when executed by a computer processor, performs a misregistration correction control method in an image forming apparatus which carries out misregistration correction for an image formed position of a plurality of colors, with the use of misregistration correction patterns, is such that, the misregistration correction control method includes a pattern forming step of forming a pattern image of either misregistration correction patterns including a plurality of position detecting marks or misregistration correction performing determination patterns having a plurality of position detecting marks, the number of which marks is smaller than that of the misregistration correction pattern image; a misregistration amount calculating step of calculating a misregistration amount based on an image formed position detected with the use of the pattern image formed in the pattern forming step; a correction performing determination step of determining whether misregistration correction is to be carried out, based on the misregistration amount calculated in the misregistration amount calculating step with the use of image formed positions of the correction performing determination patterns formed in the pattern forming step; and a correcting step of, when it is determined in the correction performing determination step to carry out misregistration correction, carrying out misregistration correction based on the misregistration amount calculated in the misregistration amount calculating step with the use of image formed positions of the misregistration correction patterns formed in the pattern forming step.

Thereby, the computer-readable information recording medium can realize a misregistration correction control function by which, correction is carried out based on a determination result as to whether misregistration correction should be carried out, and correction is carried out according to an operating condition in such timing that, even when misregistration correction is carried out, a down time does not occur.

Thus, according to the embodiments, it is possible to provide an image forming apparatus, a misregistration correction control method and a computer-readable information recording medium by which a down time and a toner consumption occurring due to misregistration correction can be reduced, the usability of the image forming apparatus is kept undegraded, and a stable color image can be formed.

Below, preferable embodiments of the present invention will be described in detail with reference to figures.

First Embodiment

<Hardware Configuration>

First, a hardware configuration of an image forming apparatus 100 in a first embodiment will be described. FIG. 1 depicts one example of a hardware configuration of the image forming apparatus in the first embodiment. FIG. 1 depicts one example of a configuration which forms an image as a result of overlaying toner images of respective colors on a surface of a paper sheet (i.e., recording paper).

[Tandem-type Image Forming Apparatus]

As depicted in FIG. 1, the image forming apparatus 100 includes image forming parts (i.e., electrophotographic process parts) 6BK, 6M, 6C and 6Y for respective colors, i.e., black, magenta, cyan and yellow. The image forming parts 6BK, 6M, 6C and 6Y include photosensitive drums 9BK, 9M, 9C and 9Y acting as image carrying members, chargers 10BK, 10M, 10C and 10Y, developers 12BK, 12M, 12C and 12Y, photosensitive drum cleaners (not depicted), static erasers 13BK, 13M, 13C and 13Y and so forth, provided in the peripheries of photosensitive drums 9BK, 9M, 9C and 9Y, respectively. The image forming parts 6BK, 6M, 6C and 6Y form toner images of the respective colors.

In the tandem-type image forming apparatus 100, the image forming parts 6BK, 6M, 6C and 6Y are disposed along a conveyance belt 5 (i.e., endless moving means).

For example, in FIG. 1, the image forming parts 6BK, 6M, 6C and 6Y for the respective colors are disposed in the stated order in a direction (referred to as a conveyance direction, hereinafter) in which a paper sheet 4 is conveyed by means of the conveyance belt 5, from the upstream through the downstream.

Thus, in the image forming apparatus 100 in which the image forming parts 6BK, 6M, 6C and 6Y are disposed, toner images of the respective colors are overlaid in the order of black, magenta, cyan and yellow, and thus, a full-color toner image is formed.

[Operation of Image Forming Apparatus]

In the image forming apparatus 100, the chargers 10BK, 10M, 10C and 10Y uniformly charge respective surfaces of the photosensitive drums 9BK, 9M, 9C and 9Y in a dark condition. Next, an exposure unit 11 emits laser beams (or exposure beams) 14BK, 14M, 14C and 14Y onto the respective surfaces of the photosensitive drums 9BK, 9M, 9C and 9Y, so that electrostatic latent images of the respective colors are formed (that is, the respective surfaces of the photosensitive drums 9BK, 9M, 9C and 9Y are exposed).

Next, in the image forming apparatus 100, the developers 12BK, 12M, 12C and 12Y visualize the respective electrostatic latent images by respective toners (i.e., develop the respective electrostatic latent images). Thus, respective toner images are formed on the surfaces of the photosensitive drums 9BK, 9M, 9C and 9Y.

In the image forming apparatus 100, from a paper feeding tray 1, a paper sheet 4 is fed by means of a paper feeding roller 2 and a separating roller 3. The fed paper sheet 4 sticks to the conveyance belt 5 by means of electrostatic force, and is conveyed to the image forming parts 6BK, 6C, 6M and 6Y of the respective colors.

The conveyance belt 5 is an endless belt wound onto a driving roller 7 and a following roller 8. The conveyance belt 5 is rotated on the driving roller 7 and the following roller 7 as a result of the driving roller 7 being driven by a driving motor (not depicted).

The toner images formed by the developers 12BK, 12M, 12C and 12Y are transferred to the paper sheet 4 by means of respective transfer units 15BK, 15M, 15C and 15Y at respective positions at which the photosensitive drums 9BK, 9M, 9C and 9Y come into contact with the paper sheet 4 on the conveyance belt 5, one by one, in sequence.

In the image forming apparatus 100, first the image forming part 6BK transfers the black toner image to the paper sheet 4. Then, the paper sheet 4 is conveyed to the next image forming part 6M by means of the conveyance belt 5, and the image forming part 6M then transfers the magenta toner image to the paper sheet 4.

The paper sheet 4 on which the black and magenta toner images are thus transferred is then conveyed to the image forming parts 6C and 6Y in sequence. The image forming part 6C transfers the cyan toner image to the paper sheet 4, and then, the image forming part 6Y transfers the yellow toner image to the paper sheet 4. Thus, a full-color toner image is formed on the paper sheet 4.

After that, the paper sheet 4 on which the full-color image has been thus formed is removed from the conveyance belt 5, and then conveyed to a fixing unit 16. The fixing unit 16 fixes the full-color toner image to the paper sheet 4. After that, the paper sheet 4 is ejected to the outside of the image forming apparatus 100.

After the transfer of the toner images are thus finished, the photosensitive drums 9BK, 9M, 9C and 9Y have residual, useless toner, which adheres to the surfaces thereof, removed by means the photosensitive drum cleaners (not depicted). Then, the static erasers 13BK, 13M, 13C and 13Y erase electricity from the photosensitive drums 9BK, 9M, 9C and 9Y, respectively. Thus, the image forming apparatus enters an image forming operation waiting state.

Thus, the image forming apparatus 100 in the first embodiment performs printing of a full-color image through the above-described image forming operation.

<Misregistration Correction>

Next, misregistration correction carried out in the image forming apparatus 100 will be described.

[Misregistration Elements Which Cause Color Shifts]

In the image forming apparatus 100, toner images of the respective colors, which should be overlaid at the same position, may not in fact be overlaid at the same position, and thus, positions at which the toner images of the respective colors are overlaid may shift. If such a situation occurs, color shifts occur, and image quality of a resulting color image degrades. Causes thereof may include, for example, errors in spaces between respective rotating shafts of the photosensitive drums 9BK, 9M, 9C and 9Y, errors in parallelism of respective installed positions of the photosensitive drums 9BK, 9M, 9C and 9Y, errors in timing at which respective electrostatic latent images are written to the photosensitive drums 9BK, 9M, 9C and 9Y, errors in respective installed positions of deflection mirrors included in the exposure unit 11, and so forth.

Actual misregistration elements may include a skew error, registration errors in a sub-scan direction, magnification errors in a main scan direction, registration errors in the main scan direction, and so forth.

[Method for Detecting Respective Misregistration Elements]

In the image forming apparatus 100, misregistration of toner images of the respective colors is corrected. Specifically, such misregistration correction is performed in such a method that, with respect to an image formed position of a black toner image, image formed positions of toner images of the other three colors, i.e., magenta, cyan and yellow, are adjusted. As depicted in FIG. 1, in the image forming apparatus 100, image detecting parts (i.e., TM (i.e., Toner Mark) sensors) 17*a*, 17*b*, 17*c* (generally referred to as "17" in FIG. 1) are provided at such positions which are on the downstream side of the image forming part 6Y, and also, are opposite to the conveyance belt 5. These image detecting parts 17*a*, 17*b* and 17*c* are supported on a common substrate in such a manner to be along a main scan direction perpendicular to a direction (i.e., a sub-scan direction) in which the paper sheet 4 is conveyed.

[Configuration of Image Detecting Parts and Peripheral Part Thereof]

Figure 2B:
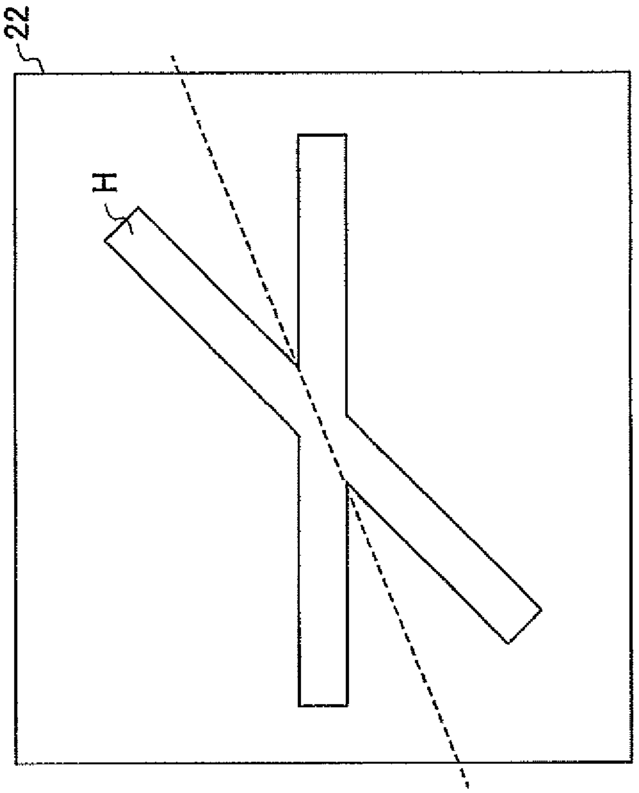
FIGS. 2A and 2B depict a configuration example of an image detecting part of the first embodiment of the present invention.
Figure 2A:
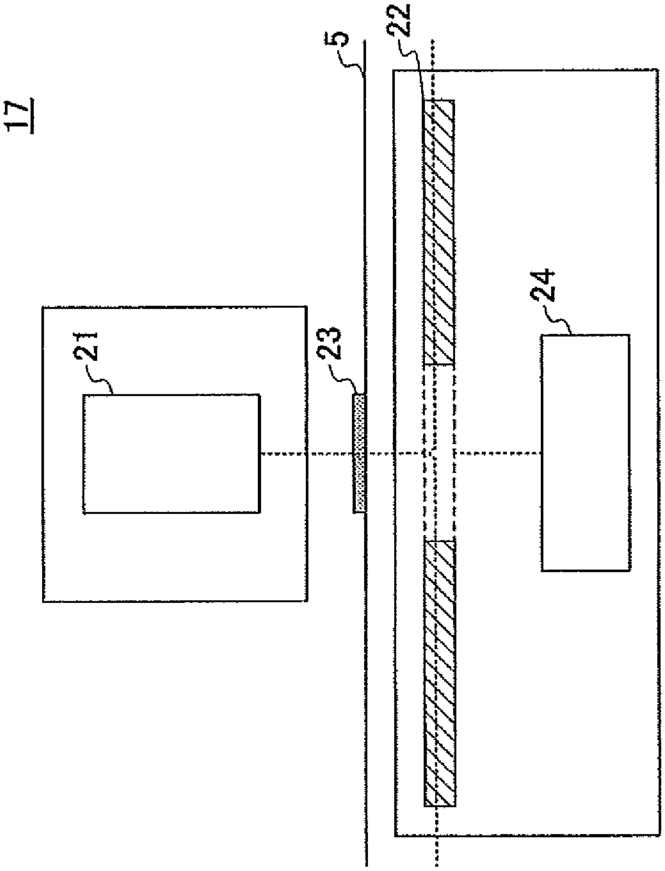
Figure 3:
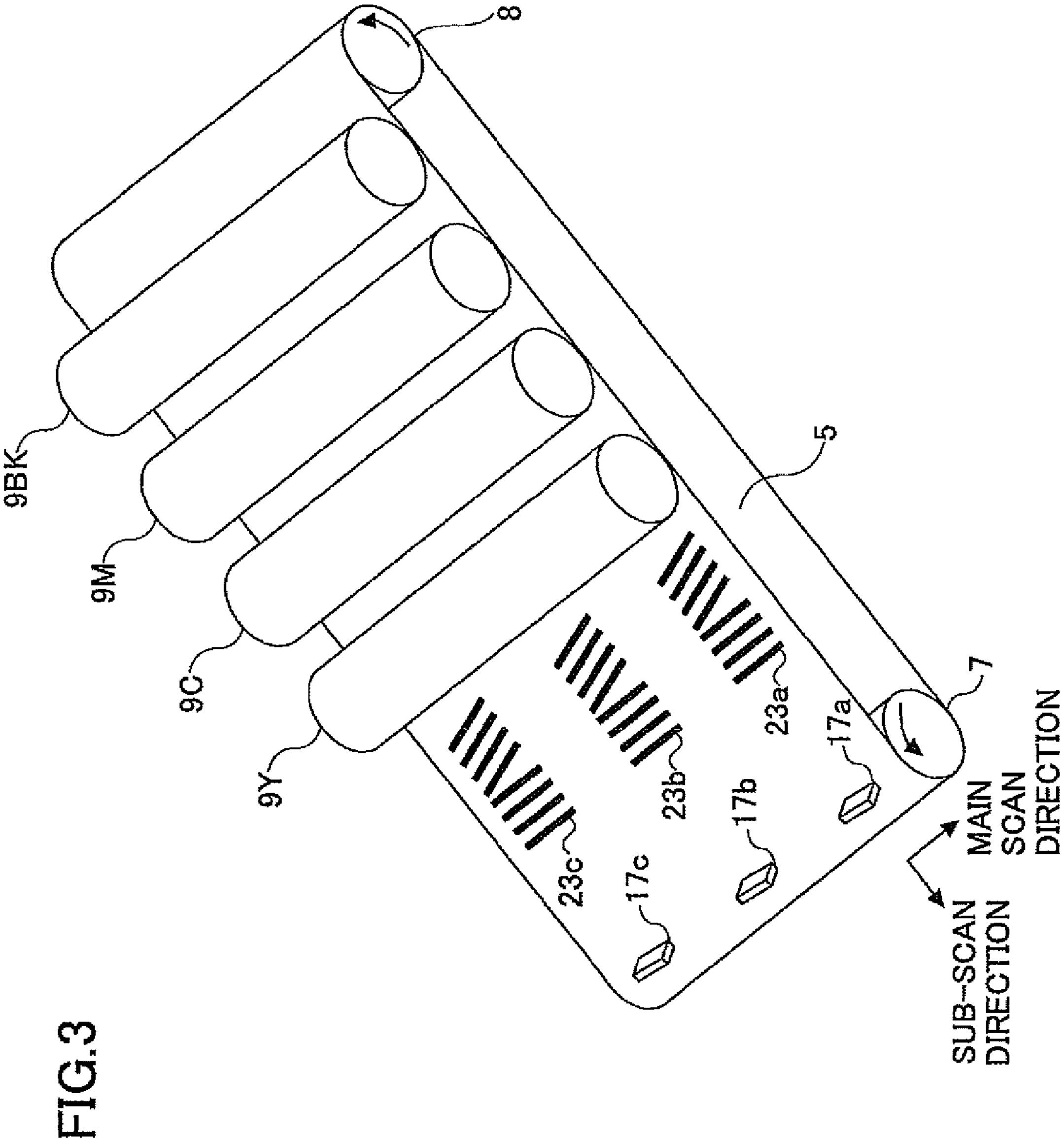
FIG. 3 depicts a configuration example of the image detecting parts and a peripheral part thereof in the first embodiment of the present invention.

FIGS. 2A and 2B depict a configuration example of each of the image detecting parts 17*a*, 17*b* and 17*c* (generally referred to as "17" in FIG. 2). FIG. 3 depicts a configuration example of a peripheral part of the image detecting parts 17*a*, 17*b* and 17*c*.

As depicted in FIG. 2A, each of the image detecting parts 17*a*, 17*b* and 17*c* includes a light emitting part 21 and a light receiving part 24 on a front surface side and a rear surface side, respectively, of the conveyance belt 5 on which toner mark patterns 23*a*, 23*b* and 23*c* (generally referred as "23" in FIG. 2A) are formed, at respective positions spaced from the front surface and the rear side of the conveyance belt 5 by predetermined distances, respectively. Further, a slit 22 is provided on the rear surface side from the conveyance belt 5 at a position between the light emitting part 21 and the light receiving part 24.

FIG. 2B depicts one example of the slit 22 of each of the image detecting parts 17*a*, 17*b* and 17*c*. The slit 22 has an opening H which is used for the light receiving part 24 to detect two types of toner mark patterns 23*a*, 23*b* and 23*c*, i.e., a pattern (referred to as a parallel pattern, hereinafter) formed on the conveyance belt 5 which extends in parallel to the main scan direction and a pattern (referred to as an inclined pattern, hereinafter) also formed on the conveyance belt 5 which is inclined from the main scan direction by a predetermined angle.

As depicted in FIG. 3, the image detecting parts 17*a*, 17*b* and 17*c* are disposed at both ends and approximately at the center in the main scan direction, respectively, and detect respective toner mark patterns 23*a*, 23*b* and 23*c* formed on the conveyance belt 5 which pass through between the light emitting parts 21 and the light receiving parts 24 of each of the respective image detecting parts 17*a*, 17*b* and 17*c*.

[Example of Toner Mark Patterns]

Figure 4:
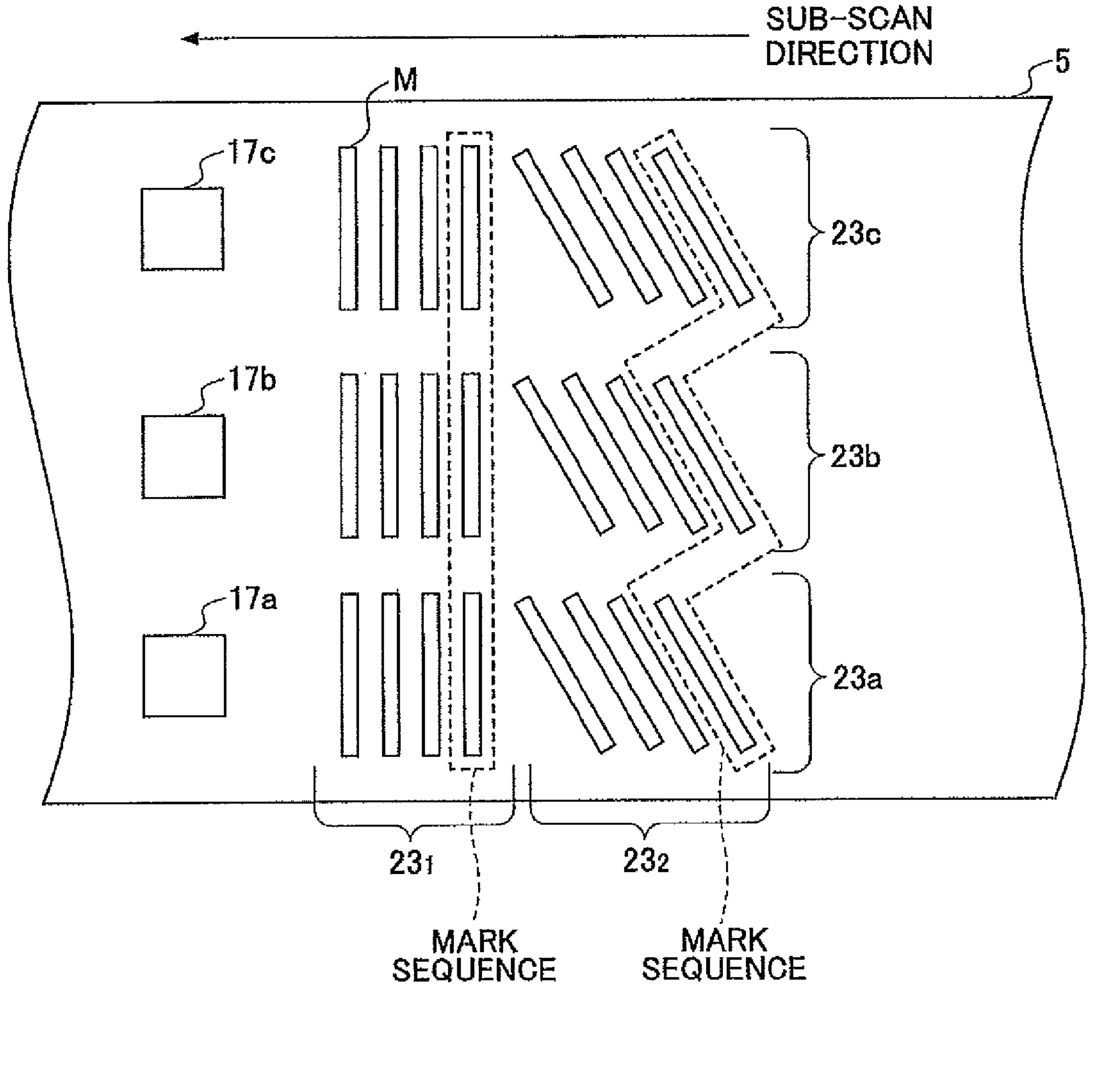
FIG. 4 depicts an image forming example of toner mark patterns according to the first embodiment of the present invention.

FIG. 4 depicts an example of image forming of the toner mark patterns 23*a*, 23*b* and 23*c* according to the first embodiment. As depicted in FIG. 4, the toner mark patterns 23*a*, 23*b* and 23*c* are formed at both ends and approximately at the center on the conveyance belt 5 corresponding to the image detecting parts 17*a*, 17*b* and 17*c*, respectively. As depicted in FIG. 4 as being defined by broken lines, each sequence of toner marks M disposed along a line in the main scan direction (which is perpendicular to the sub-scan direction) is referred to as a "mark sequence". In FIG. 4, such an example is depicted that, for each of the respective colors, i.e., black, cyan, magenta and yellow, two types of patterns, i.e., the above-mentioned parallel patterns $\mathbf{23}_1$ and inclined patterns $\mathbf{23}_2$, are formed at both ends (i.e., in FIG. 4, the patterns 23*a* and 23*c*) and approximately at the center (i.e., the patterns 23*b*) on the conveyance belt 5, respectively. That, is, in the example of FIG. 4, the parallel patterns $\mathbf{23}_1$ include four mark sequences, corresponding to the above-mentioned respective four colors, each mark sequence including three toner marks N, i.e., 23*a*, 23*b* and 23*c*. These four mark sequences are disposed in the sub-scan direction. Similarly, the inclined patterns $\mathbf{23}_2$ include four mark sequences, corresponding to the above-mentioned respective four colors, each mark sequence including three toner marks M, i.e., 23*a*, 23*b* and 23*c*. These four mark sequences are disposed in the sub-scan direction.

The image forming apparatus 100 forms electrostatic latent images of toner mark patterns 23*a*, 23*b* and 23*c*, and forms toner images of the toner mark patterns 23*a*, 23*b* and 23*c*, by controlling the image forming parts 6BK, 6M, 6C and 6Y, and the exposure unit 11. As a result, on the conveyance belt 5, the toner mark patterns 23*a*, 23*b* and 23*c* are formed.

In the toner mark patterns 23*a*, 23*b* and 23*c*, each of the parallel patterns $\mathbf{23}_1$ and inclined patterns $\mathbf{23}_2$ include a plurality of toner marks M (i.e., position detecting marks) each mark extending linearly (i.e., a line segment having a predetermined width). Further, the toner mark patterns 23*a*, 23*b* and 23*c* are disposed in such a manner that, the centers of the respective adjacent toner marks M are aligned to form a line with predetermined spaces therebetween (i.e., in a condition in which the predetermined spaces are provided therebetween) in the main scan direction and in the sub-scan direction.

The image forming apparatus 100 forms the above-mentioned toner mark patterns 23*a*, 23*b* and 23*c* on the conveyance belt 5 as mentioned above. The respective toner marks M of the thus-formed toner mark patterns 23*a*, 23*b* and 23*c* move in the sub-scan direction as a result of the conveyance belt 5 being driven, and then, reach the openings H of the slits 22 of the image detecting parts 17*a*, 17*b* and 17*c*. At this time, in the image forming apparatus 100, detection signals of the image detecting parts 17*a*, 17*b* and 17*c*, which signals are image detection results of detecting the toner marks M, thus have mountain-like or valley-like waveforms. Thus, positions of the centers of the respective toner marks M can be precisely detected based on the detection signals.

[Correction Method]

In the image forming apparatus 100, from such detection results of the image detecting parts 17*a*, 17*b* and 17*c*, image formed positions (referred to as pattern positions, hereinafter) of the toner mark patterns 23*a*, 23*b* and 23*c* are obtained, and a CPU (Central Processing Unit) included in an engine controller for example carries out a predetermined calculation process. As the engine controller, the control system 50 described later with reference to FIG. 5 may act, and, in this case, the above mentioned CPU corresponds to a CPU 32 depicted in FIG. 5. Thereby, a misregistration amount of sub-scan registration, a skew, a magnification error in the main scan direction, a misregistration amount of main scan registration, and so forth, can be obtained as various misregistration amounts. Then, in misregistration correction, the following correction is carried out based on these calculation results, i.e., the various misregistration amounts.

That is, correction of the skew is carried out in such a method that, for example, an actuator is used to incline a deflection mirror in the exposure unit 11 or the exposure unit 11 itself.

Correction of misregistration of sub-scan registration is carried out in such a method that, for example, writing timing of a main scan line, a phase of a reflecting surface of a reflecting mirror (i.e., a polygon mirror, included in the exposure unit 11) or such, is controlled. Further, correction of a magnification error in the main scan direction is carried out in such a method that, for example, a writing pixel frequency is changed.

Correction of misregistration of registration in the main scan direction is carried out in such a method that, writing timing of a main scan line is changed.

Thus, in the image forming apparatus 100, the toner mark patterns 23*a*, 23*b* and 23*c* are formed on the conveyance belt 5, and the image detecting parts 17*a*, 17*b* and 17*c* disposed at the predetermined positions detect pattern positions of the toner mark patterns 23*a*, 23*b* and 23*c*. Then, in the image forming apparatus 100, a calculation process for misregistration correction is carried out with the use of the detection results, and misregistration correction is carried out based on the calculation result.

<Operation Control of Misregistration Correction>

Below, a method to control operation of misregistration correction according to the first embodiment will be described.

[Configuration of Control System]

Figure 5:
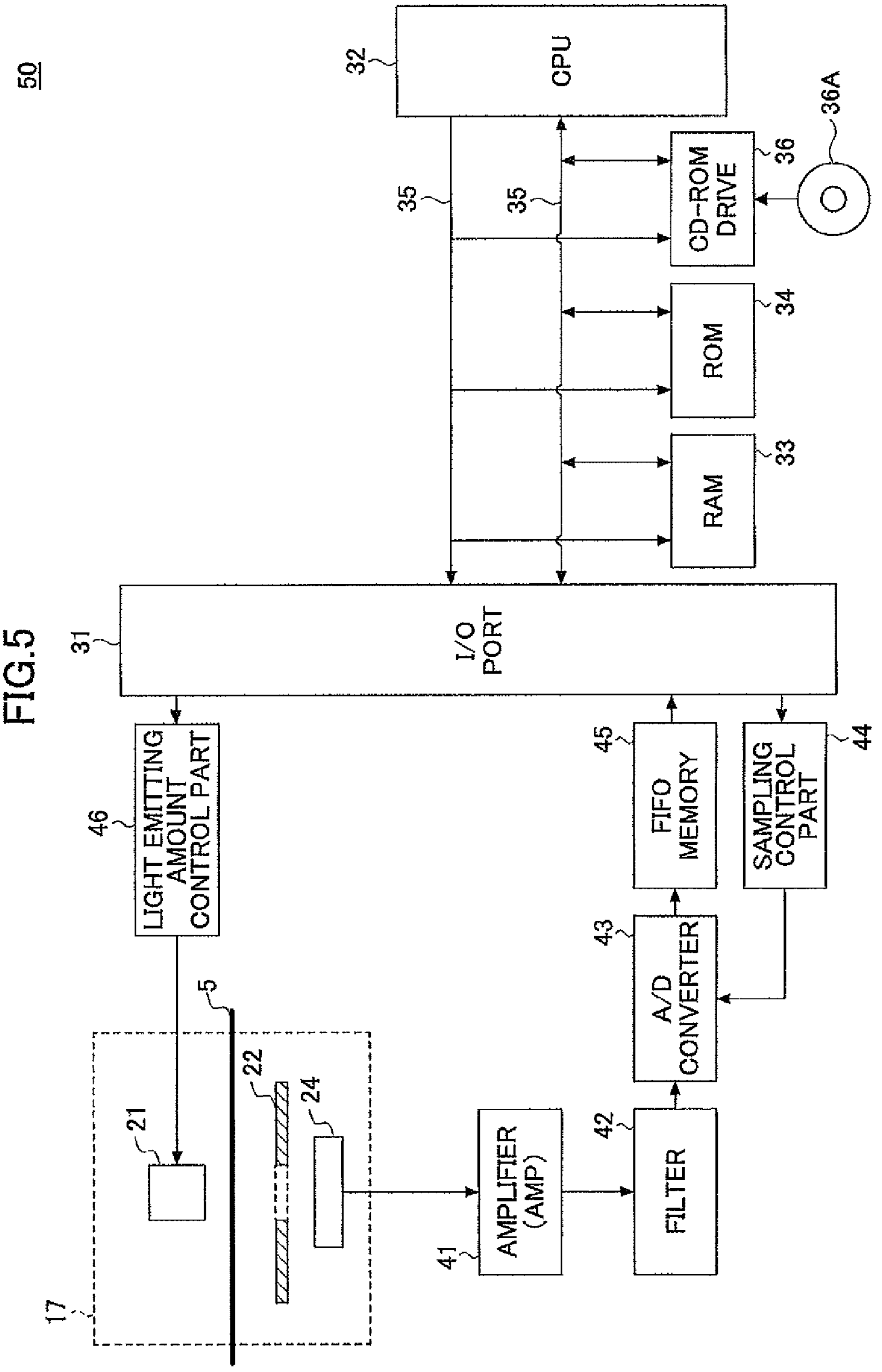
FIG. 5 depicts a configuration example of a control system which controls misregistration correction according to the first embodiment of the present invention.

FIG. 5 depicts a configuration example of a control system 50 which controls misregistration correction according to the first embodiment.

The image forming apparatus 100 includes the control system 50 depicted in FIG. 5, and controls operation of misregistration correction. Further, although only a process concerning misregistration correction will be described in the description below, the control system 50 (i.e., a control part) also controls the entirety of the image forming apparatus 100 such as various device/units included in the image forming apparatus 100.

The control system 50 includes an I/O port 31, a CPU 32, a RAM (Random Access Memory) 33, a ROM (Read Only Memory) 34, and a CD-ROM drive 36.

The I/O port 31 provides an input/output interface for data and control signals which are transmitted/received between the control system 50 and respective devices/units acting as control targets (for example, the image detecting parts 17*a*, 17*b* and 17*c*). In the ROM 34, various programs and data (for example, various control values) used for carrying out operation control are stored. In the RAM 33, the various programs read out from the ROM 34 and data (including image data) are temporarily stored. By executing the programs for operation control read out from the ROM 34 and then stored in the RAM 33 (i.e., carrying out operation processes according to the various control values), the CPU 32 inputs the control signals (i.e., generates control commands) into the respective devices/units acting as control targets, and controls the respective devices/units acting as control targets.

The CPU 32, RAM 33, ROM 34 and CD-ROM drive 36 are mutually connected via buses 35. Further, the respective devices/units acting as control targets are connected with the CPU 32, RAM 33, ROM 34 and CD-ROM drive 36 via the I/O port 31.

When receiving the detection signals from the image detecting parts 17*a*, 17*b* and 17*c*, the control system 50 carries out signal processing described below.

[Signal Processing After Pattern Detection (Calculation of Various Misregistration Amounts)]

When the light receiving parts 24 included in the image detecting parts 17*a*, 17*b* and 17*c* detect the respective toner marks M formed on the conveyance belt 5 by means of light emitted by the light emitting parts 21 via the slits 22, the light receiving parts 24 generate detection signals to an amplifier 41 depicted in FIG. 5. The detection signals are then amplified by the amplifier 41. Only signal components of mark detection are extracted through a filter 42, and the signal components of mark detection are input to the A/D converter 43. The A/D converter 43 converts the mark detection signals to digital signals. Sampling the signals carried out for converting the mark detection signals into the digital signal is carried out by means of a sampling control part 44 which receives the control signal from the CPU 32 via the I/O port 31. The A/D converter 43 stores the thus-sampled digital signals in a predetermined storage area of a FIFO (i.e., First-In First-Out) memory 45.

In the control system 50, when detection of the parallel patterns $\mathbf{23}_1$ and/or the inclined patterns $\mathbf{23}_2$ of the toner mark patterns 23*a*, 23*b* and 23*c* including the plurality of toner marks M formed on the conveyance belt 5 is thus finished, the CPU 32 reads from the FIFO memory 45 the sampled digital signals via the I/O port 31, and stores the sampled digital signals in the RAM 33. The CPU 32 then carries out a predetermined calculation process on the sampled digital signals to calculate various misregistration amounts.

It is noted that the CPU 32 monitors light receiving signals from the light receiving parts 24 of the image detecting parts 17*a*, 17*b* and 17*c*, and controls light emitting amounts of the light emitting parts 21 by means of a light emitting amount control part 46 for the purpose of keeping detecting accuracy at a constant level, even when degradation occurs in the conveyance belt 5, the light emitting parts 21 or such. Therefore, the light receiving parts 24 can at any time receive signals at a constant level.

The control system 50 carries out misregistration correction based on the various misregistration amounts thus calculated in the above-mentioned process.

[Configuration of Misregistration Control Function]

When the image forming apparatus 100 enters a predetermined operating condition, the image forming apparatus 100 forms on the conveyance belt 5 toner mark patterns 23*a*, 23*b* and 23*c* of performing determination patterns Pa for determining whether to carry out misregistration correction. Next, the image forming apparatus 100 calculates various misregistration amounts based on pattern formed positions of the toner mark pattern 23*a*, 23*b* and 23*c*, and determines whether to carry out misregistration correction based on the calculated misregistration amounts. When the determination result is to carry out misregistration correction, the image forming apparatus 100 then forms on the conveyance belt 5 toner mark patterns 23*a*, 23*b* and 23*c* of correction patterns Pb for carrying out misregistration corrections and carries out misregistration correction based on the calculated misregistration amounts obtained from the thus-formed correction patterns Pb.

In the image forming apparatus 100, as a result of misregistration correction being carried out, a predetermined amount of toner is consumed, and also, a predetermined time is consumed. The toner consumption is disadvantageous for a user, and the predetermined time constitutes a down time for the user.

Therefore, the image forming apparatus in the first embodiment has a misregistration correction control function of carrying out control such that, misregistration correction is carried out when a result of determination as to whether it is necessary to carry out misregistration correction is that misregistration correction is necessary, and also, according to an operating condition of the image forming apparatus 100, the misregistration correction is carried out in such timing that, even when misregistration correction is carried out, a down time does not occur.

Thereby, in the image forming apparatus 100, a down time and a toner consumption occurring due to misregistration correction are reduced, the usability of the image forming apparatus is kept undegraded, and a stable color image can be formed.

Figure 6:
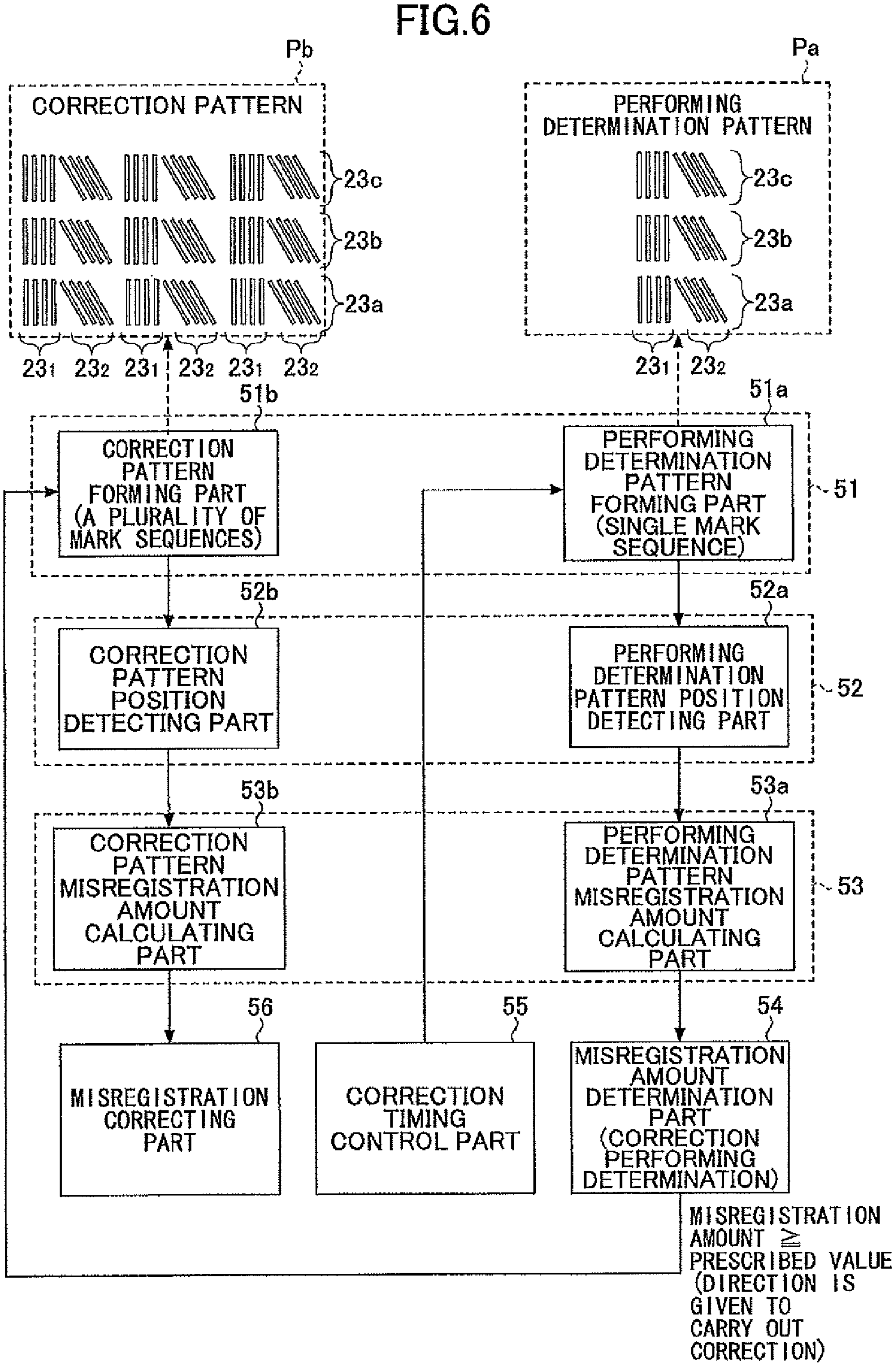
FIG. 6 depicts a configuration example of a misregistration correction control function according to the first embodiment of the present invention.

FIG. 6 depicts a configuration example of the misregistration correction control function according to the first embodiment.

The misregistration correction control function according to the first embodiment includes a pattern forming part 51, a pattern detecting part 52, a pattern misregistration amount calculating part 53, a misregistration amount determination part 54, a correction timing control part 55 and a misregistration correcting part 56.

The pattern forming part 51 forms toner mark patterns 23*a*, 23*b* and 23*c* on the conveyance belt 5. The pattern detecting part 52 detects positions of the formed patterns.

The pattern misregistration amount collecting part 53 (i.e., a misregistration amount calculating part) calculates various misregistration amounts based on the detected positions of the patterns. The misregistration amount determination part 54 determines whether the calculated misregistration amounts fall within respective prescribed ranges.

The correction timing control part 55 (i.e., an operation start control part) controls timing to carry out misregistration correction. The misregistration correcting part 56 (i.e., a correcting part) carries out predetermined misregistration correction to cancel out the misregistration amounts based on the calculated various misregistration amounts.

The above-mentioned respective function parts 51, 52, 53, 54, 55 and 56 are realized as a result of a control program stored in the ROM 34 being read, being written in the RAM 43 and being executed by the CPU 32.

The misregistration correction control function can be divided into four main functions, i.e., a pattern forming function, a misregistration amount calculating function, a correction performing determination function and a correction timing control function, which will be described below.

(1) Pattern Forming Function:

The pattern forming function is a function of forming toner mark patterns 23*a*, 23*b* and 23*c* of either the performing determination patterns Pa for determining whether to carry out misregistration correction or the correction patterns Pb for carrying out misregistration correction, on the conveyance belt 5.

When receiving an instruction to form toner mark patterns 23*a*, 23*b* and 23*c*, the pattern forming part 51 obtains image data of toner mark patterns 23*a*, 23*b* and 23*c* which are previously stored in the ROM 34. Next, the pattern forming part 51 controls the image forming parts 6BK, 6M, 6C and 6Y and the exposure unit 11 based on the thus-obtained image data, and forms electrostatic latent images of the toner mark patterns 23*a*, 23*b* and 23*c* on the respective surfaces of the photosensitive drums 9BK, 9M, 9C and 9Y of the respective colors. Then, the electrostatic latent images formed on the photosensitive drums 9BK, 9M, 9C and 9Y are developed by respective toners, and then, the developed toner images are transferred to the conveyance belt 5 by means of an electrostatic process. Thus, the pattern forming part 51 forms the toner mark patterns 23*a*, 23*b* and 23*c* with image forming operation in the same manner as for regular printing.

Thus, the pattern forming part 51 forms toner mark patterns 23*a*, 23*b* and 23*c* of either the performing determination patterns Pa for determining whether to carry out misregistration correction or the correction patterns Pb for carrying out misregistration correction, on the conveyance belt 5.

For this purpose, the pattern forming part 51 includes a performing determination pattern forming part 51*a* for forming toner mark patterns 23*a*, 23*b* and 23*c* of the performing determination patterns Pa and a correction pattern forming part 51*b* for forming toner mark patterns 23*a*, 23*b* and 23*c* of the correction patterns Pb.

FIG. 6 depicts examples of respective toner mark patterns 23*a*, 23*b* and 23*c* (in FIG. 6, Pa and Pb) formed by the performing determining pattern forming part 51*a* and the correction pattern forming part 51*b*.

(1-1) Toner Mark Patterns for the Performing Determination Patterns:

The performing determination patterns Pa are patterns for determining whether to carry out misregistration correction. The performing determination pattern forming part 51*a* forms toner mark patterns 23*a*, 23*b* and 23*c* including toner marks M, the number of which is smaller than the number of toner marks M included in toner mark patterns 23*a*, 23*b* and 23*c* of the correction patterns Pb. Specifically, for example, as depicted in FIG. 6, Pa, the toner mark patterns 23*a*, 23*b* and 23*c* include one set of toner mark patterns which includes two sets of mark sequences, i.e., parallel patterns $\mathbf{23}_1$ and inclined patterns $\mathbf{23}_2$.

(1-2) Toner Mark Patterns for the Correction Pattern:

The correction patterns Pa are patterns used for carrying out misregistration correction. The correction pattern forming part 51*b* forms toner mark patterns 23*a*, 23*b* and 23*c* including toner marks M, the number of which is larger than the number of toner marks M included in toner mark patterns 23*a*, 23*b* and 23*c* of the performing determination patterns Pa. Specifically, for example, as depicted in FIG. 6, Pb, the toner mark patterns 23*a*, 23*b* and 23*c* include a plurality of (in FIG. 6, three) sets of toner mark patterns, each set including two sets of mark sequences, i.e., parallel patterns $\mathbf{23}_1$ and inclined patterns $\mathbf{23}_2$.

Thus, the correction pattern forming part 51*b* forms, as depicted in FIG. 6, Pb, the plurality of (in FIG. 6, three) sets of toner mark patterns, each set including predetermined patterns (i.e., two sets of mark sequences, i.e., parallel patterns $\mathbf{23}_1$ and inclined patterns $\mathbf{23}_2$). The reason for forming the plurality of sets of toner mark patterns in the correction patterns Pb is to cancel out possible fluctuation errors caused by rotation fluctuations of the photosensitive drums 9BK, 9M, 9C and 9Y, the conveyance belt 5, and so forth (i.e., to improve correction accuracy).

Further, the correction pattern forming part 51*b* operates only when it is determined, in a correction performing determination function, which will be described later, that misregistration correction is to be carried out.

Thus, by the misregistration correction control function according to the first embodiment, the pattern forming part 51 forms two types of toner mark patterns, the two types having different numbers of toner marks M, according to the purpose of using the toner mark patterns.

(2) Misregistration Amount Calculating Function:

The misregistration amount calculating function is a function of calculating various misregistration amounts based on pattern positions of toner mark patterns 23*a*, 23*b* and 23*c* formed by the pattern forming part 51.

Below, operation of detecting pattern positions and calculating misregistration amounts performed by the misregistration amount collecting function will be described.

(2-1) Detection of Pattern Positions:

The pattern position detecting part 52 detects pattern positions of toner mark patterns 23*a*, 23*b* and 23*c* based on detection results of the toner mark patterns 23*a*, 23*b* and 23*c* formed on the conveyance belt 5 by the pattern forming part 51. As described above in the signal processing, the pattern position detecting part 52 receives the detection results obtained as a result of predetermined signal processing having been carried out on the detection signals obtained from the light receiving parts included in the image detecting parts 17*a*, 17*b* and 17*c*. The pattern position detecting part 52 calculates and detects pattern positions of the toner mark patterns 23*a*, 23*b* and 23*c* by means of a predetermined calculating process based on the thus-obtained detection results.

(2-2) Calculation of Misregistration Amounts:

The pattern misregistration amount calculating part 53 calculates various misregistration amounts based on the pattern positions of the toner mark patterns 23*a*, 23*b* and 23*c* detected by the pattern position detecting part 52. The pattern misregistration amount calculating part 53 compares the detected pattern positions of the toner mark pattern 23*a*, 23*b* and 23*c* with respective predetermined reference positions, and calculates misregistration amounts. Misregistration correction is carried out in such a manner that, respective pattern positions of black, cyan, magenta and yellow may become the same. That is, correction is made in such a manner that, the respective colors may become overlaid at the same pattern position. Therefore, the pattern misregistration amount calculating part 53 calculates, by a predetermined calculating process, various misregistration amounts, such as distances in each of the main and sub-scan directions, inclination, and so forth, of pattern positions of the other colors (for example, cyan, magenta and yellow), with respect to a pattern position of a specific color (for example, black, i.e., a reference color).

(2-3) Configuration of Function Parts Corresponding to the Formed Patterns:

As described above, in the pattern forming function, one of two types of toner mark patterns 23*a*, 23*b* and 23*c*, i.e., either the performing determination patterns Pa or the correction patterns Pb, are formed. Therefore, the pattern position detecting parts 52 and the pattern misregistration amount calculating part 53 have such function configurations to respectively correspond to the two types of toner mark patterns 23*a*, 23*b* and 23*c*.

Detection of pattern positions and calculation of misregistration amounts for the performing determination patterns Pa are carried out by the performing determination pattern position detecting part 52*a* and the performing determination pattern misregistration calculating part 52*a*. Further, detection of pattern positions and calculation of misregistration amounts for the correction patterns Pb are carried out by the correction pattern position detecting part 52*b* and the correction pattern misregistration amount calculating part 52*b* It is noted that, the correction pattern position detecting part 52*b* and the correction pattern misregistration amount calculating part 52*b* function only when it is determined to carry out misregistration correction by the correction performing determination function described later.

For example, when formed toner mark patterns 23*a*, 23*b* and 23*c* are one set of the performing determination patterns Pa including toner marks M of the respective colors, the performing determination pattern position detecting part 52*a* carries out the predetermined calculating process based on detection results of the toner mark patterns 23*a*, 23*b* and 23*c*, and calculates and detects pattern positions of the respective colors. Information of the thus-detected pattern positions is sent to the performing determination pattern misregistration amount calculating part 53*a*, which then calculates various misregistration amounts of formed images of the respective colors (i.e., colors other than the reference color).

On the other hand, when formed toner mark patterns 23*a*, 23*b* and 23*c* are a plurality of sets of the correction patterns Pb including toner marks M of the respective colors, the correction pattern position detecting part 52*b* obtains a plurality of detection results corresponding to the plurality of sets of correction patterns Pb for each of the respective colors. Then, the correction pattern position detecting part 52*b* averages, for each of the respective colors, the plurality of detection results corresponding to the plurality of (in the example of FIG. 6, three) sets of correction patterns Pb, and carries out the predetermined calculating process based on a thus-obtained average, and calculates and detects a pattern position of each of the respective colors. Information of the thus-detected pattern positions is sent to the correction pattern misregistration amount calculating part 53*b*, which then calculates various misregistration amounts of formed images of the respective colors (i.e., colors other than the reference color).

Thus, according to the misregistration correction control function according to the first embodiment, by means of the misregistration amount calculating part 53, either the misregistration amounts calculated based on the toner mark patterns 23*a*, 23*b* and 23*c* of the performing determination patterns Pa or the misregistration amounts calculated based on the toner mark patterns 23*a*, 23*b* and 23*c* of the correction patterns Pb are obtained.

The misregistration amounts calculated by the performing determination pattern misregistration amount calculating part 53*a* are sent to the misregistration amount determination part 54 described later, and are used to determine whether to carry out misregistration correction. Further, the misregistration amounts calculated by the correction pattern misregistration amount calculating part 53*b* are sent to the misregistration correcting part 56, and are used for misregistration correction.

The misregistration correcting part 56 controls respective devices/units/members concerning image forming operations in such a manner that, based on the misregistration amounts, pattern positions of the respective colors may become located at the same position.

(3) Correction Performing Determination Function (i.e., a Correction Performing Determination Part):

The correction performing determination function is a function of determining whether it is necessary to carry out misregistration correction, according to the given misregistration amounts. The misregistration amount determination part 54 determines, based on the misregistration amounts calculated by the performing determination pattern misregistration amount calculating part 53*a*, whether misregistration correction should be carried out.

The misregistration amount determination part 54 compares the calculated misregistration amounts with the previously determined respective prescribed values (i.e., a predetermined threshold), and determines whether the calculated misregistration amounts are equal to or larger than the respective prescribed values (i.e., misregistration amount≧prescribed value). It is noted that, the prescribed values are the respective maximum values of such misregistration amounts that an output color image is not adversely affected and image quality is maintained at a constant level. Therefore, the prescribed values may not be fixed, but may be variable values which can be variably set, and can be flexibly adapted, because the values depend on various factors such as characteristics of the image forming apparatus 100.

Thus, by the misregistration correction control function according to the first embodiment, the misregistration amount determination part 54 determines whether such color shifts occur that degrade the image quality (i.e., whether to carry out misregistration correction.

When the calculation results of misregistration amounts are equal to or larger than the respective prescribed values, the misregistration amount determination part 54 provides a direction to the correction pattern forming part 51*b* to form toner mark patterns 23*a*, 23*b* and 23*c* of the correction patterns Pb (i.e., provides a direction to carry out misregistration correction).

On the other hand, when the calculation results of misregistration amounts are smaller than the respective prescribed values, no direction is provided to the correction pattern forming part 51*b* (i.e., misregistration correction is not carried out).

(4) Correction Timing Control Function:

The correction timing control function is a function of controlling timing of carrying out misregistration correction for optimum timing. By the correction timing control function, an operating condition of the image forming apparatus 100 is monitored, and control is carried out such that, misregistration correction is carried during such a predetermined period that no down time occurs, according to the operating condition.

In order to reduce a down time occurring due to misregistration correction, in addition to "not carrying out misregistration correction when no misregistration occurs in the image forming apparatus 100", a method is considered in which misregistration correction is carried out in such an operating condition that no down time occurs.

For this purpose, the correction timing control part 55 first provides a direction to the performing determination pattern forming part 51*a* to form toner mark patterns 23*a*, 23*b* and 23*c* of the performing determination patterns Pa when detecting a predetermined operating condition, from a result of monitoring the operating condition of the image forming apparatus 100. Thus, it is determined whether misregistration correction is to be carried out, before the misregistration correction is actually carried out.

The predetermined operating condition is a condition predetermined based on actual measurements using test data or such. For example, a condition in which a plurality of pages are currently being printed (i.e., images of the plurality of pages are currently being formed), a condition in which printing of a plurality of pages is now finished (i.e., forming of images of the plurality of pages is now finished), or such, may be used as the predetermined operating condition. Thus, an operating condition previously measured and verified concerning characteristics of the image forming apparatus 100 may be used as the predetermined operating condition. A reason why a down time does not occur will now be described in each of the above-mentioned condition in which a plurality of pages are currently being printed (i.e., images of the plurality of pages are currently being formed) and the above-mentioned condition in which printing of a plurality of pages is now finished (i.e., forming of images of the plurality of pages is now finished). That is, in a case where a plurality of pages of images are printed out in the image forming apparatus 100, a longer time is required than in a case where only a single page is printed out. Therefore, even when misregistration correction is carried out during a plurality of pages being printed out or just after a plurality of pages have been printed out, a time required for the misregistration correction may not cause a user to believe that an extra time occurs and thus the user waits more time than is necessary.

Further, because operating conditions depend on various factors such as the characteristics of the image forming apparatus 100, the predetermined operating conditions may not be fixed, but may have variable values which are variably set so that flexibly adapting to a range of operating conditions is made possible.

Thus, by the misregistration correction control function according to the first embodiment, misregistration correction is carried out according to the operating condition of the image forming apparatus 100.

[Details of Control Procedure]

Below, operation of the misregistration correction control function will be described.

Figure 7:
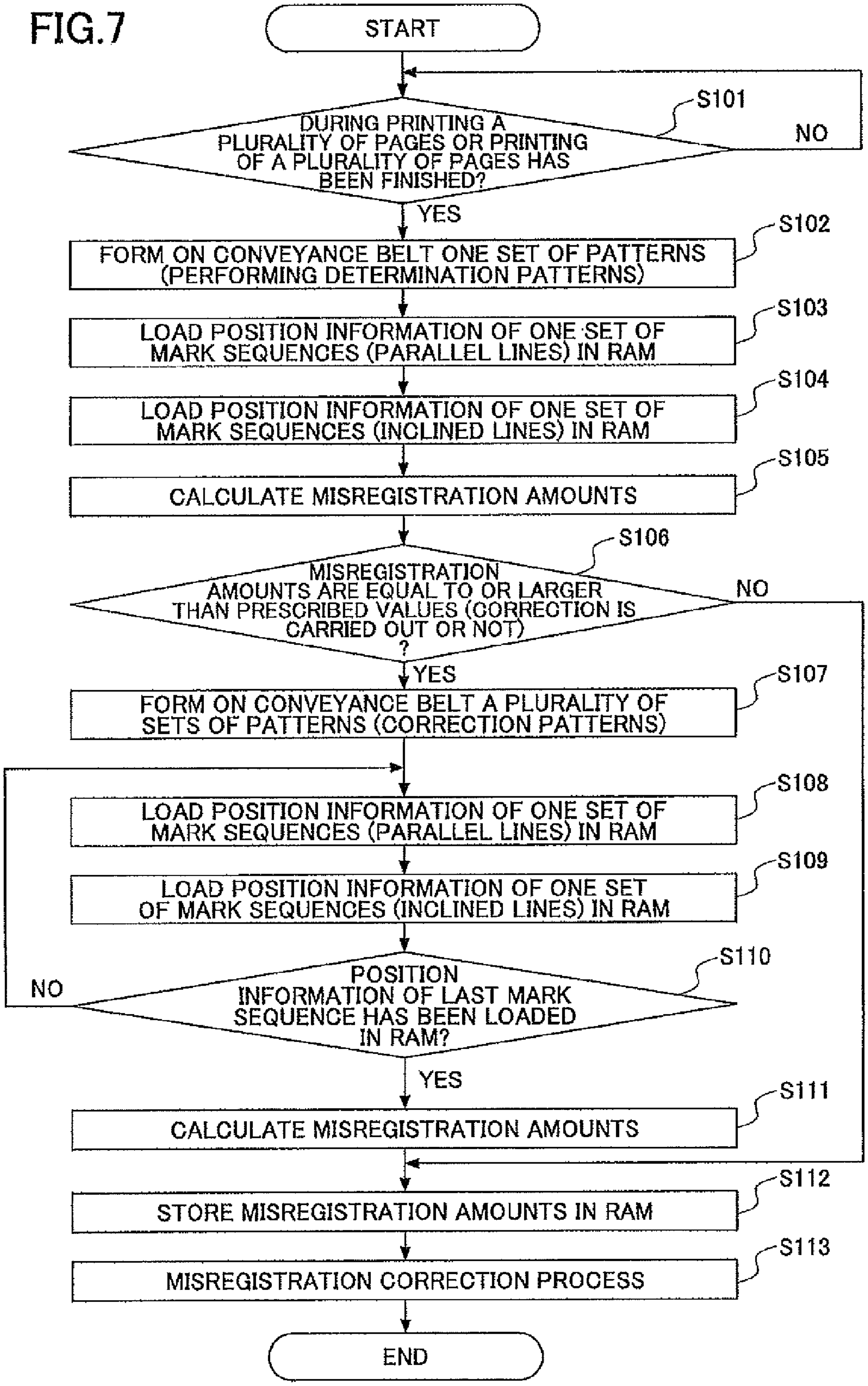
FIG. 7 is a flowchart depicting a misregistration correction control procedure according to the first embodiment of the present invention.

FIG. 7 is a flowchart depicting one example of control procedure of the misregistration correction according to the first embodiment. It is noted that, in FIG. 7, a procedure example under the following conditions is depicted:

(Conditions)

The performing determination patterns Pa are toner mark patterns 23*a*, 23*b* and 23*c*, including one set of toner mark patterns which include two sets mark sequences, i.e., parallel patterns $\mathbf{23}_1$ and inclined patterns $\mathbf{23}_2$.

The correction patterns Pb are toner mark patterns 23*a*, 23*b* and 23*d*, including a plurality of sets of toner mark patterns, each set including two sets mark sequences, i.e., parallel patterns $\mathbf{23}_1$ and inclined patterns $\mathbf{23}_2$.

As the above-mentioned predetermined operating conditions for starting misregistration correction, a condition during printing of a plurality of pages and a condition at a time of a plurality of pages being finished, are previously set.

(Control Procedure)

The image forming apparatus 100 according to the first embodiment monitors an operating condition of the image forming apparatus 100, and determines whether a current operating condition is any one of a condition during printing of a plurality of pages and a condition at a time of finishing printing of a plurality of pages (step S101).

When the image forming apparatus 100 determines that the current operating condition is neither a condition during printing a plurality of pages nor a condition at a time of finish printing of a plurality pages (No in step S101), the image forming apparatus 100 returns to this determination step S101.

On the other hand, when determining that the current operating condition is any one of a condition during printing of a plurality of pages or a condition at a time of finishing printing of a plurality of pages (Yes in step S101), the image forming apparatus 100 forms, by means of the performing determination pattern forming part 51*a*, one set of toner mark patterns (i.e., the performing determination patterns Pa) on the conveyance belt 5 (step S102).

Next, the image forming apparatus 100 writes in the RAM 33 pattern positions of the respective colors calculated based on detection results of mark sequences of one set of parallel patterns $\mathbf{23}_1$, of the mark sequences included in the toner mark patterns, formed on the conveyance belt 5, by means of the performing determination pattern position detecting part 52*a* (step S103)

Further, the image forming apparatus 100, by means of the performing determination pattern position detecting part 52*a*, writes in the RAM 33 pattern positions of the respective colors calculated based on detection results of mark sequences of one set of inclined patterns $\mathbf{23}_2$ (step S104).

The image forming apparatus 100 then calculates various misregistration amounts based on pattern position data of the respective colors read out from the RAM 33 by means of the performing determination pattern position detecting part 52*a* (step S105).

Next, the image forming apparatus 100 compares the calculated values of the misregistration amounts with the predetermined prescribed values, and determines whether the misregistration amounts are equal to or larger than the prescribed values, by means of the misregistration amount determination part 54 (step S106). That is, in this step, it is determined whether to carry out misregistration correction.

When determining from the comparison result that the values of the misregistration amounts are smaller than the prescribed values (No in step S106), the image forming apparatus 100 carries out step S112 of a misregistration amount storing process described below. Thus, when the misregistration amounts are smaller than the prescribed values, it is determined that misregistration correction should not be carried out.

On the other hand, when the image forming apparatus 100 determines from the comparison result that the values of the misregistration amounts are equal to or larger than the prescribed values (Yes in step S106), the image forming apparatus 100, by means of the correction pattern forming part 51*b*, forms a plurality of sets of toner mark patterns 23*a*, 23*b* and 23*c* (i.e., the correction patterns Pb) on the conveyance belt 5 (step S107). Thus, when the misregistration amounts are equal to or larger than the prescribed values, it is determined that misregistration correction should be carried out.

The image forming apparatus 100, by means of the correction pattern position detecting part 52*b*, writes, in the RAM 33, pattern position data of the respective colors calculated based on detection results of a mark sequence of one set of parallel patterns $\mathbf{23}_1$, out of mark sequences included in the toner mark patterns 23*a*, 23*b* and 23*c* formed on the conveyance belt 5 (step S108).

The image forming apparatus 100, by means of the correction pattern position detecting part 52*b*, writes, in the RAM 33, pattern position data of the respective colors calculated based on detection results of a mark sequence of one set of inclined patterns $\mathbf{23}_2$, out of mark sequences included in the toner mark patterns 23*a*, 23*b* and 23*c* formed on the conveyance belt 5 (step S109).

Then, the image forming apparatus 100 determines whether pattern position data of the last set of a mark sequence (i.e., a mark sequence which has been formed last) included in the plurality of sets of mark sequences has been written in the RAM 33 (step S110).

When pattern position data of the last set of a mark sequence has not been written in the RAM 33 yet (No in step S110), the image forming apparatus 100 repeats steps 108 and 109 of writing the pattern position data in the RAM 33.

On the other hand, when pattern position data of the last set of a mark sequence has been already written in the RAM 33 (Yes in step S110), the image forming apparatus 100, by means of the correction pattern misregistration calculating part 53*b*, calculates various misregistration amounts based on the pattern position data thus written in the RAM 33 for the respective colors (step S111).

After that, the image forming apparatus 100 stores in the RAM 33 thus-calculated various misregistration amounts (step S112).

The image forming apparatus 100 then carries out misregistration correction based on the various misregistration amounts thus stored in the RAM 33 by means of the misregistration correcting part 56 (step S113).

Thus, in the image forming apparatus 100 according to the first embodiment, the control program for carrying out the above-mentioned control procedure is stored in ROM 34, the CPU 32 reads out the control program from the ROM 34 and writes in the RAM 32, and executes the control program. Thus, the misregistration correction control function is realized.

[Variation of Performing Determination Patterns]

Below, toner mark patterns 23*a*, 23*b* and 23*c* formed by the performing determination pattern forming part 51*a* in the image forming apparatus 100 according to the first embodiment will be described, as supplementary information.

Figure 8:
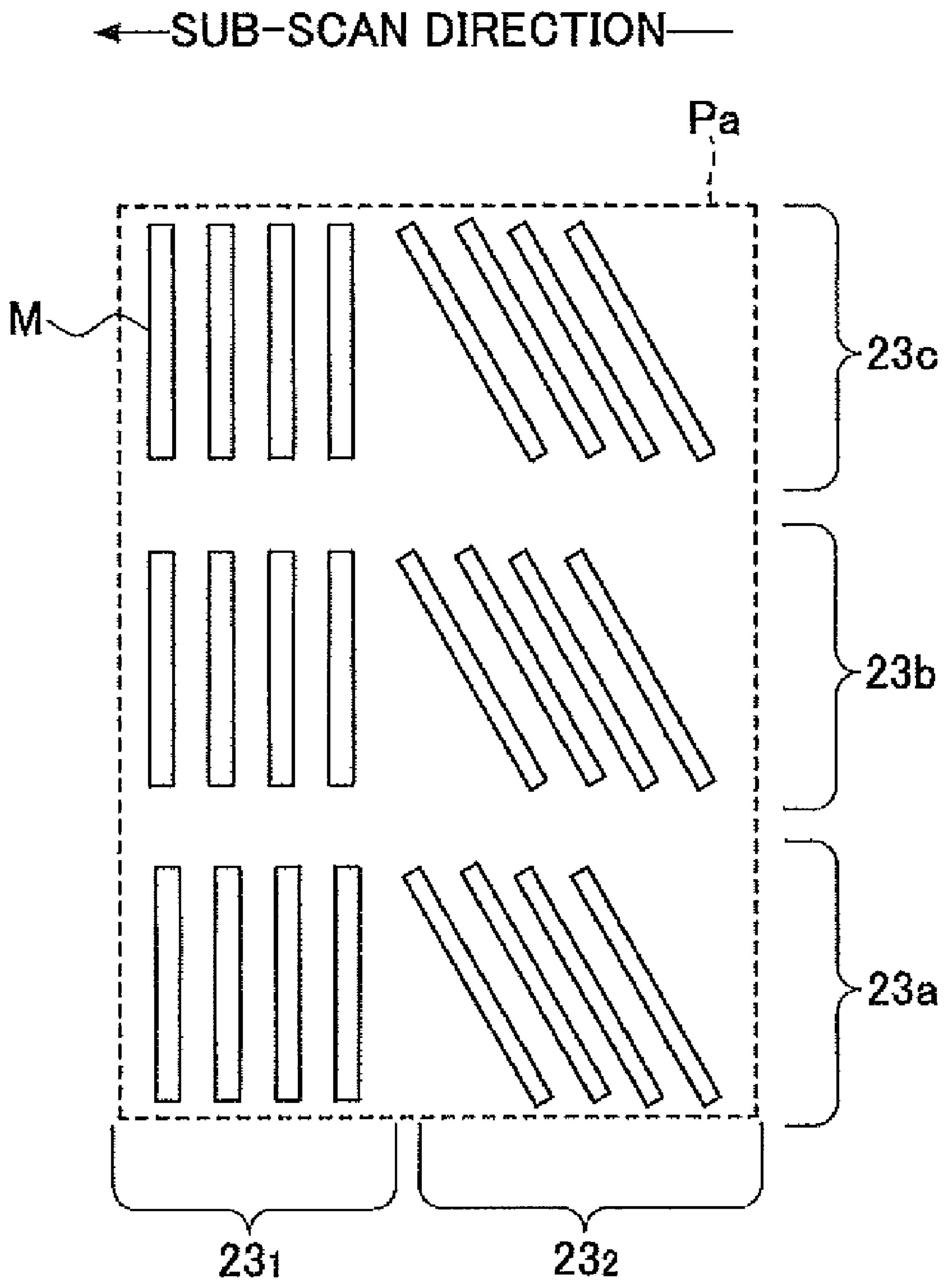
FIG. 8, FIGS. 9A, 9B, 9C and 9D and FIGS. 10A and 10B depict examples of toner mark patterns of performing determination patterns according to the first embodiment of the present invention.

FIG. 8 depicts one example of toner mark patterns 23*a*, 23*b* and 23*c* (of the performing determination patterns Pa).

The toner mark patterns 23*a*, 23*b* and 23*c* are one example of the performing determination patterns Pa formed by the performing determination pattern forming part 51*a*. The performing determination patterns Pa depicted in FIG. 8 includes two sets of mark sequences, i.e., parallel patterns $\mathbf{23}_1$ and inclined patterns $\mathbf{23}_2$. The mark sequences include toner mark patterns 23*a*, 23*b* and 23*c* (each of 23*a*, 23*b* and 23*c* being referred to as a mark group, hereinafter) corresponding to the respective image detecting parts 17*a*, 17*b* and 17*c* disposed at both ends and approximately the center of the main scan direction. Each mark group includes four parallel toner marks M, corresponding to black, cyan, magenta and yellow, respectively, and other four toner marks M inclined by a predetermined angle, corresponding to black, cyan, magenta and yellow, respectively.

Thus, the toner mark patterns 23*a*, 23*b* and 23*c* of the performing determination patterns Pa are patterns formed for the purpose of determining whether to carry out misregistration correction, and are not patterns actually used for misregistration correction. Therefore, high accuracy is required, and thus, the toner mark patterns 23*a*, 23*b* and 23*c* of the performing determination patterns Pa may have a configuration which is simpler than a configuration of the toner mark patterns 23*a*, 23*b* and 23*c* of the correction patterns Pb.

Therefore, as the performing determination patterns Pa, some pattern examples with which a toner consumption and a down time occurring due to misregistration correction can be reduced may be used.

When the number of toner marks M included in the performing determination patterns Pa is large, a corresponding time is required for detecting pattern positions, calculating misregistration amounts, and so forth, and thus, a time required for the entirety of misregistration correction increases accordingly. Further, a toner amount consumed when forming the toner mark patterns increases, and thus, an extra toner consumption may occur.

Therefore, the number of toner marks M included in the performing determination patterns Pa may be reduced in comparison to the correction patterns Pb, and the performing determination patterns Pa may include the minimum number of toner marks M for calculating misregistration amounts of the respective colors.

Therefor, not only a pattern example depicted in FIG. 8, but also a pattern example depicted in any one of FIGS. 9A, 9B, 9C and 9D and FIGS. 10A and 10B, may be used as the performing determination patterns Pa according to the first embodiment.

FIGS. 9A, 9B, 9C and 9D and FIGS. 10A and 10B depict examples of toner mark patterns 23*a*, 23*b* and 23*c* of the performing determination patterns Pa. For example, the performing patterns Pa depicted in FIG. 9A include only parallel patterns $\mathbf{23}_1$, and mark sequences include three mark groups 23*a*, 23*b* and 23*c*. Each mark group 23*a*, 23*b* or 23*c* includes four toner marks M corresponding to the respective colors. The performing determination patterns Pa depicted in FIG. 9B have a different configuration in mark groups from the configuration of the performing determination pattern Pa of FIG. 9A. Specifically, in the configuration of FIG. 9B, each mark group 23*a*, 23*b* or 23*c* includes a toner mark $M_2$ corresponding to a reference color, for example, black, and another toner mark $M_1$ corresponding to any other one color (i.e., any one of cyan, magenta and yellow).

Figure 9D:
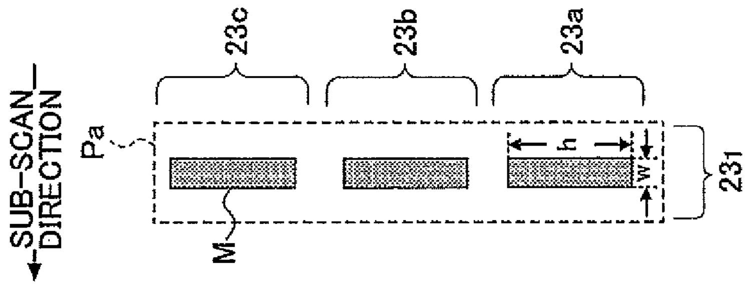
Figure 9C:
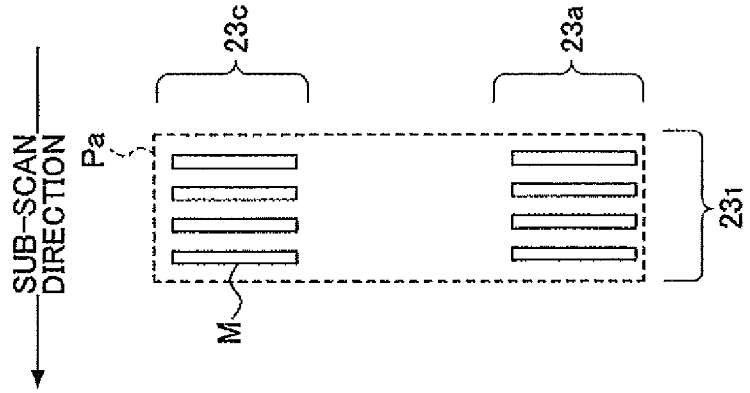
Figure 9B:
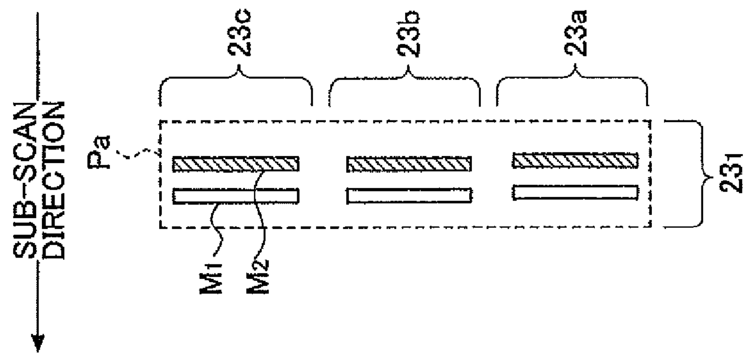

When it is determined whether to carry out misregistration correction with the use of the patterns depicted in FIG. 9B, a misregistration amount between pattern positions of any other one color and the reference color is calculated, and the determination is made based on the calculation result. Since the number of toner marks M included in the patterns depicted in FIG. 9B is smaller than the patterns of FIG. 9A, it is possible to reduce a toner consumption and a processing time.

Figure 9A:
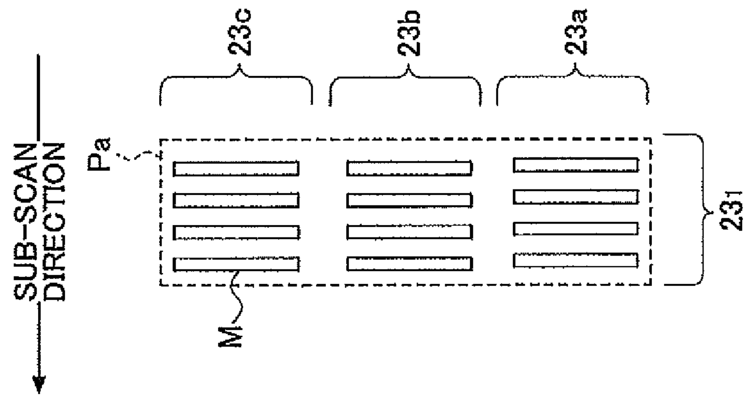

Further, other pattern examples may be used, as described below:

The performing determination patterns Pa depicted in FIG. 9C include mark sequences of parallel patterns $\mathbf{23}_1$ the same as the patterns of FIG. 9A, but as being different from the patterns of FIG. 9A, the mark sequences include two mark groups, 23*a* and 23*c*. The respective mark groups 23*a* and 23*c* are formed at such positions that the image detecting parts 17*a* and 17*c* disposed on both ends of the main scan direction can detect these mark groups 23*a* and 23*c*.

The performing determination patterns Pa depicted in FIG. 9D include mark sequences of parallel patterns $\mathbf{23}_1$, and the mark sequences include three mark groups 23*a*, 23*b* and 23*c*. Each mark group 23*a*, 23*b* or 23*c* includes toner marks M corresponding to the reference color and any other one or more colors. In each mark group 23*a*, 23*b* or 23*c*, these toner marks M are formed to overlay one another at the same position.

When it is determined whether to carry out misregistration correction with the use of the patterns depicted in FIG. 9D, a misregistration amount of pattern positions between any other one or more colors and the reference color is calculated based on widths (w) and/or heights (h) of the detected toner marks M, and the determination is made based on the calculation result.

In this case, when misregistration occurs, the width (w) and/or the height (h) of each detected toner mark M are larger than the width (w) and/or the height (h) of the toner mark M of the reference color (i.e., an area of the toner mark M (w×h) increase accordingly) because formed positions of the respective toner marks M of the any other one or more colors and the reference color shift therebetween.

Therefore, it is possible to calculate a misregistration amount based on the amount of change of the width (w) and/or the height (h) of the toner mark M. Thus, by using the patterns of FIG. 9D, it is possible to reduce a processing time required to determine whether to carry out misregistration correction, in comparison to the case of the patterns of FIG. 9B, since a misregistration amount can be calculated from a single detection result of each of the image detecting parts 17*a*, 17*b* and 17*c*.

Figure 10A:
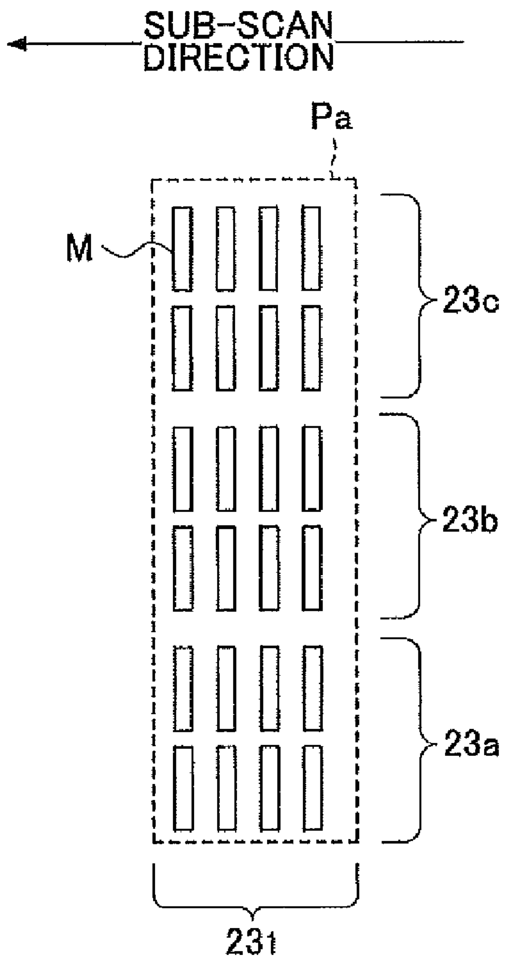
Figure 10B:
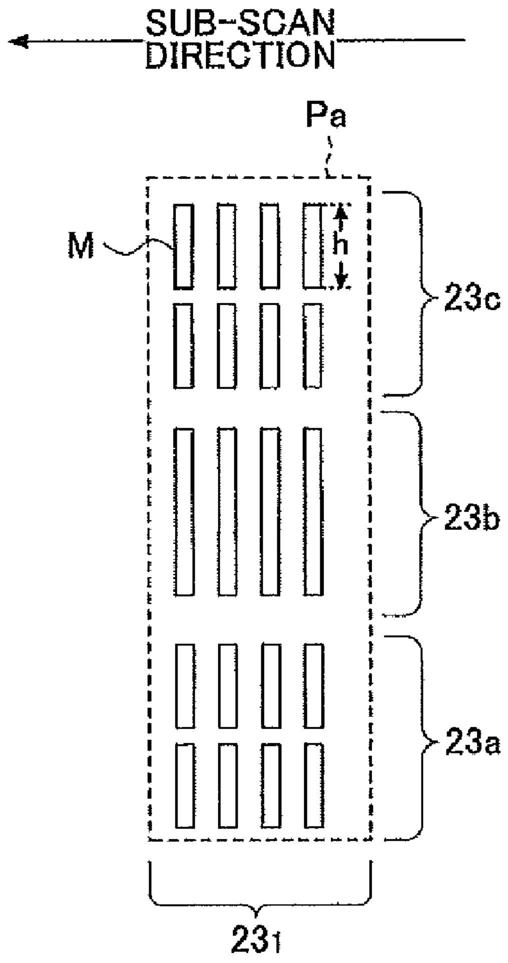

Further, FIG. 10A depicts another pattern example. The performing determination patterns 23*a*, 23*b* and 23*c* depicted in FIG. 10A include toner marks M each having a height (h) smaller than that of each toner mark M included in the patterns depicted in FIGS. 8, 9A, 9B and 9C. Further, FIG. 10B depicts another pattern example. The performing determination patterns 23*a*, 23*b* and 23*c* depicted in FIG. 10B include toner marks M having different heights (h) (i.e., toner marks M being different in their one sides) among 23*a*, 23*b* and 23*c*. Any one of the above-mentioned patterns may be used.

Thus, in the image forming apparatus 100 according to the first embodiment, in order to reduce a toner consumption and a down time occurring due to misregistration correction, the above-described toner mark patterns 23*a*, 23*b* and 23*c* or 23*a* and 23*c* of the performing determination patterns Pa are used to determine whether to carry out misregistration correction. Further, in the description of the respective patterns described above with reference to FIGS. 9A, 9B, 9C and 9D and FIGS. 10A and 10B, pattern examples including mark sequences of parallel patterns $\mathbf{23}_1$ have been described. For the same pattern examples, mark sequences of inclined patterns $\mathbf{23}_2$ may also be used.

Summary of First Embodiment

Thus, according to the first embodiment, the image forming apparatus 100 forms toner mark patterns 23*a*, 23*b* and 23*c* (or 23*a* and 23*c*) of the performing determination patterns Pa on the conveyance belt 5 when entering a predetermined operating condition, and the image detecting parts 17*a*, 17*b* and 17*c* (or 17*a* and 17*c*) detect the toner marks M. Next, the image forming apparatus 100 calculates misregistration amounts based on pattern positions which have been calculated from the detection results, and determines whether to carry out misregistration correction, based on the calculated misregistration amounts.

Then, when determining to carry out misregistration correction, the image forming apparatus 100 forms toner mark patterns 23*a*, 23*b* and 23*c* of the correction patterns Pb on the conveyance belt 5, and the image detecting parts 17*a*, 17*b* and 17*c* detect the toner marks M. Next, the image forming apparatus 100 calculates misregistration amounts based on pattern positions which have been calculated from the detection results, and carries out correction to cancel out the misregistration amounts based on the calculated misregistration amounts.

Thus, the image forming apparatus 100 carries out misregistration correction when determining that it is necessary to carry out misregistration correction. Further, the image forming apparatus 100 carries out misregistration correction in timing such that a down time does not occur even when misregistration correction is carried out, according to an operating condition of the image forming apparatus 100.

Thereby, the image forming apparatus 100 can form a stable color image, with a reduction of a down time and a toner consumption occurring due to misregistration correction, without degrading the usability of the image forming apparatus.

Second Embodiment

In the first embodiment described above, the image forming apparatus 100 determines whether to carry out misregistration correction in the misregistration correction control procedure.

Thereby, the image forming apparatus 100 determines whether to carry out misregistration correction based on misregistration amounts calculated from detection results (i.e., pattern positions) of the performing determination patterns Pa.

At this time, the calculated misregistration amounts may differ among the expression colors of the image forming apparatus 100.

Therefore, in a case where it is determined to carry out misregistration correction, misregistration correction should not necessarily be required for all of the colors other than the reference color. For example, when calculated misregistration amounts are such that image quality of an output color image is not adversely affected for any color, misregistration correction should not be carried out for the color.

Therefore, in a second embodiment, misregistration correction is carried out only for colors for which calculated misregistration amounts are at such levels that an output color image may be adversely affected.

Below, a misregistration correction control function of an image forming apparatus 100 according to the second embodiment will be described. Description of the misregistration correction control function of the image forming apparatus 100 according to the second embodiment will be made only for points different from the misregistration correction control function of the image forming apparatus 100 according to the first embodiment. The other configurations and functions of the image forming apparatus 100 according to the second embodiment can be the same as those of the image forming apparatus 100 according to the first embodiment, and a duplicate description will be omitted.

<Control of Misregistration Correction Operation>

The misregistration correction control function according to the second embodiment is mainly different from that of the first embodiment in that, according to the second embodiment, the determination as to whether to carry out misregistration correction is carried out for each color, and images of the correction patterns Pb are formed only for required colors. The details will be described as a misregistration correction control procedure. Description for the same steps as those of the first embodiment will be omitted appropriately.

[Details of Control Procedure]

Figure 11:
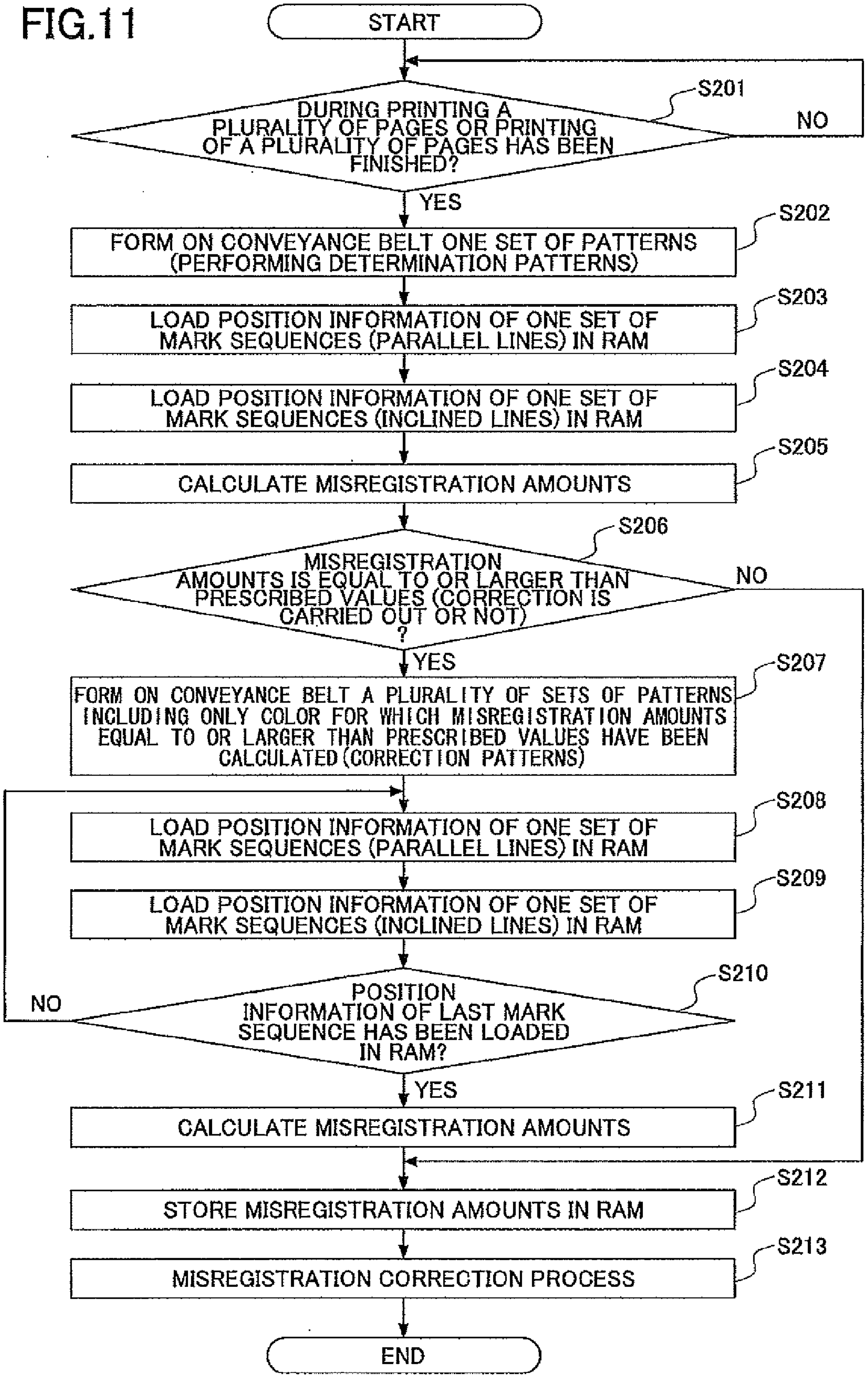
FIG. 11 depicts is a flowchart depicting a misregistration correction control procedure according to a second embodiment of the present invention.

FIG. 11 is a flowchart depicting one example of the misregistration correction control procedure according to the second embodiment. As can be comparatively seen from FIGS. 7 and 11, step S207 is a difference between the first and second embodiments.

The image forming apparatus 100 according to the second embodiment calculates, by means of the performing determination pattern misregistration calculating part 53*a*, various misregistration amounts for each color based on pattern position data of the color read out from the RAM 33 (step S205)

Next, the image forming apparatus 100, by means of the misregistration determination part 54, compares the calculated values of the misregistration amounts with predetermined respective prescribed values, and determines, for each color, whether to carry out misregistration correction (step S206). That is, in step S206, it is determined whether to carry out misregistration correction for each color.

When it is determined that the values of the misregistration amounts are smaller than the respective prescribed values (No in step S206), the image forming apparatus 100 carries out step S212 of storing the misregistration amounts for the purpose of storing the misregistration amounts of the determined color. Thus, when the calculated misregistration amounts are smaller than the prescribed values, it is then determined that, the determined color is a color for which the calculated misregistration amounts have such a small level that image quality of an output color image is not adversely affected, i.e., it is not necessary to carry out misregistration correction.

On the other hand, when it is determined from the comparison result that the misregistration amounts are equal to or larger than the respective prescribed values (Yes in step S206), the image forming apparatus 100, by means of the correction pattern forming part 51*b*, forms a plurality of sets of toner mark patterns 23*a*, 23*b* and 23*c* of the correction patterns Pb which include only the determined color on the conveyance belt 5 (step S207). Thus, when the calculated misregistration amounts are equal to or larger than the prescribed values for the determined color, it is then determined that, the determined color is a color for which the calculated misregistration amounts have such a large level that image quality of an output color image may be adversely affected, and thus, misregistration correction should be carried out.

Thus, the image forming apparatus 100 forms the toner mark patterns 23*a*, 23*b* and 23*c* of the correction patterns Pb only including the color for which the misregistration amounts equal to or larger than the prescribed values have been thus calculated (i.e., the color for which the misregistration amounts equal to or larger than the prescribed values have occurred), by the correction pattern forming part 51*b*.

Figure 12B:
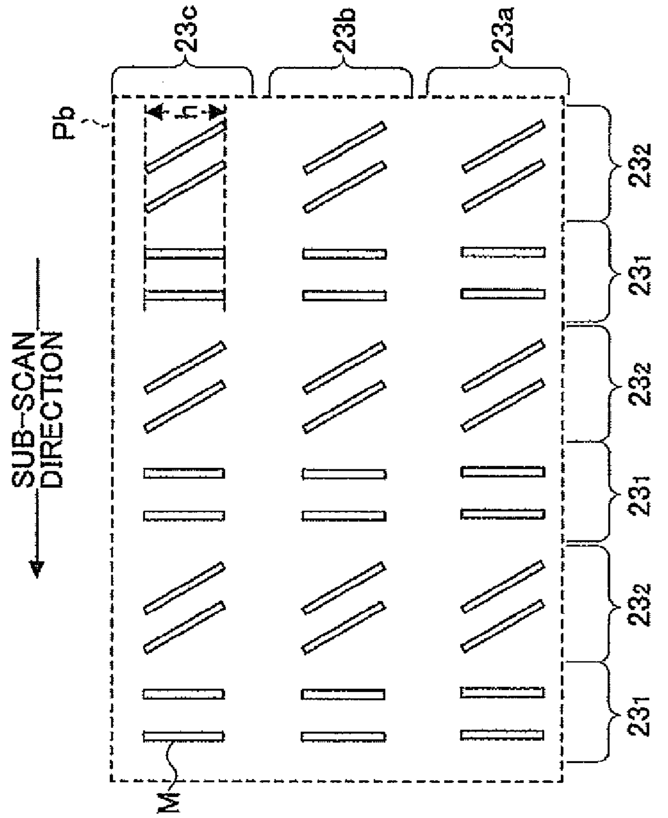
FIGS. 12A and 12B depict examples of toner mark patterns of correction patterns according to the second embodiment of the present invention.
Figure 12A:
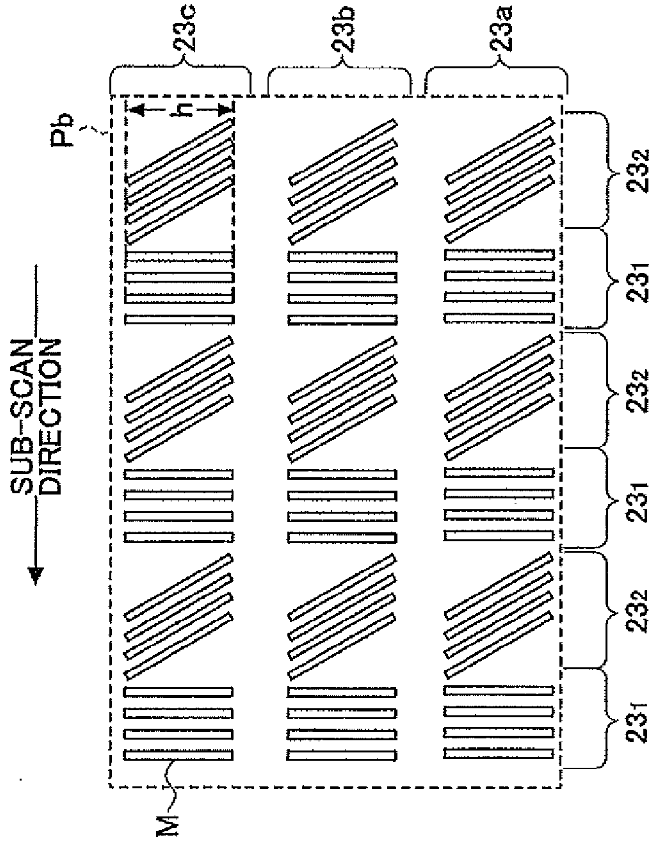

FIGS. 12A and 12B depict examples of the toner mark patterns 23*a*, 23*b* and 23*c* of the correction patterns Pb according to the second embodiment. The correction patterns Pb depicted in FIG. 12A are one example of toner mark patterns 23*a*, 23*b* and 23*c* formed based on a determination to carry out misregistration correction according to the first embodiment. On the other hand, the correction pattern Pb depicted in FIG. 12B are one example of toner mark patterns 23*a*, 23*b* and 23*c* formed based on a determination to carry out misregistration correction for each color according to the second embodiment.

As depicted in FIG. 12A, when the determination to carry out misregistration correction is not carried out for each color as in the second embodiment, the toner mark patterns 23*a*, 23*b* and 23*c* of the correction patterns Pb for all the colors, which may include colors for which misregistration correction should not necessarily be performed, are formed.

In contrast thereto, according to the second embodiment, as depicted in FIG. 12B, the toner mark patterns 23*a*, 23*b* and 23*c* of the correction patterns Pb only including a color for which misregistration amounts have such a large level that image quality of an output color image may be adversely affected, and thus, misregistration correction should be carried out, are formed.

Thereby, in the image forming apparatus 100 according to the second embodiment, toner consumption and a processing time occurring due to misregistration correction are reduced accordingly.

Further, in the image forming apparatus 100 according to the second embodiment, as described above, based on misregistration amounts calculated by the performing determination pattern misregistration amount calculating part 53*a*, it is determined whether to carry out misregistration correction for each color, as one example of processing. However, this manner of processing should not be limited to this one example.

That is, for example, when any one of the image forming parts 6BK, 6M, 6C and 6Y has been replaced in the image forming apparatus 100, it may be determined that, misregistration correction should be carried out for the corresponding color.

The thus-replaced image forming part 6BK, 6M, 6C or 6Y is in an initial condition, and thus, it may be necessary to carry out misregistration correction for the purpose of providing a stable color image. For this purpose, in the image forming apparatus 100, when replacement of any one of the image forming parts 6BK, 6M, 6C and 6Y has been detected, it is determined, based on the detection result, that the color corresponding to the replaced one of the image forming parts 6BK, 6M, 6C and 6Y is a color for which misregistration correction should be carried out. Then, toner mark patterns 23*a*, 23*b* and 23*c* of the correction patterns Pb corresponding to this color are formed on the conveyance belt 5.

Further, as depicted in FIG. 12B, in the correction patterns Pb according to the second embodiment, the toner marks M included in the patterns may have heights (h) smaller than those of the correction patterns Pb including all the colors as depicted in FIG. 12A.

Summary of Second Embodiment

Thus, according to the second embodiment, when entering the predetermined operating condition, the image forming apparatus 100 forms toner mark patterns 23*a*, 23*b* and 23*c* of the performing determination patterns Pa on the conveyance belt 5, and, by means of the image detecting parts 17*a*, 17*b* and 17*c*, detects toner marks M thereof. Next, the image forming apparatus 100 calculates misregistration amounts based on pattern positions calculated from the detection results, and determines, for each color, whether to carry out misregistration correction, based on the calculated misregistration amounts.

When determining, in the above-mentioned determination, to carry out misregistration correction for a color, the image forming apparatus 100 forms toner mark patterns 23*a*, 23*b* and 23*c* of the correction patterns Pb including only the color for which misregistration correction is to be carried out, and, by means of the image detecting parts 17*a*, 17*b* and 17*c*, detects toner marks M thereof. Next, the image forming apparatus 100 calculates misregistration amounts based on pattern positions calculated from the detection results, and carries out misregistration correction in such a manner to cancel out the misregistration amounts.

That is, the image forming apparatus 100 according to the second embodiment carries out misregistration correction based on a result of the determination for each color whether to carry out misregistration correction.

Thus, the image forming apparatus 100 according to the second embodiment has such advantages the same as those of the first embodiment that a down time and a toner consumption occurring due to misregistration correction can be reduced, the usability of the image forming apparatus is not degraded, and a stable color image can be formed.

Up to now, the respective embodiments have been described. The control program (i.e., a code describing the above-described respective control steps in a programming language corresponding to an operating environment (i.e., a platform) of the control system 50) for realizing the above-mentioned misregistration correction control function of each embodiment may be stored in a computer-readable information recording medium, such a CD-ROM 36A depicted in FIG. 5. The CD-ROM 36A is read by means of the CD-ROM drive 36 also depicted in FIG. 5.

Thus, the above-mentioned control program may be stored in the above-mentioned CD-ROM 36A, a flexible disk, a CD (Compact Disc), a DVD (Digital Versatile Disk), or such, and may be installed in the image forming apparatus 100 via a corresponding drive (in the example of the CD-ROM 36A, the CD-ROM drive 36 depicted in FIG. 5) through which the control program is read therefrom. Further, alternatively, the control program may be stored in an auxiliary storage such as a flash memory such as a SD memory card or a USB (Universal Serial Bus) memory, and may be installed in the image forming apparatus 100 through a corresponding I/F through which the control program is read from the auxiliary storage.

Further, the image forming apparatus 100 has a data communication I/F (not depicted) through which a data transmission line such as a communication network (not depicted) is connected, and thus, the above-mentioned control program may be downloaded with the use of a communication network such as the Internet, and may be installed in the image forming apparatus 100.

Further, in each of the respective embodiments, the image forming apparatus 100 forms a color image in a tandem method described above with reference to FIG. 1. However, the tandem method should not be necessarily used. For example, the image forming apparatus 100 may include an intermediate transfer belt, toner images of the respective colors may be transferred onto the intermediate belt in a mutually overlaying manner from the respective photosensitive drums 9BK, 9M, 9C and 9Y on which respective color toner image have been developed, and the thus-formed color image, i.e., the thus-overlaid respective color toner images, may be then transferred to a paper sheet 4 from the intermediate transfer belt. In such a case, the above-mentioned toner mark patterns 23*a*, 23*b* and 23*c* may be formed on the intermediate transfer belt.

Further, according to each of the respective embodiments, each of the image detecting parts 17*a*, 17*b* and 17*c* has the slit 22 between the light emitting part 21 and the light receiving part 24. However, such a configuration should not necessarily be limited to the configurations previously described. Each of the image detecting parts 17*a*, 17*b* and 17*c* may not have such a slit, as long as each of the image detecting parts 17*a*, 17*b* and 17*c* can detect a toner mark M.

Further, in the toner mark patterns 23*a*, 23*b* and 23*c* according to each of the respective embodiments, each of toner marks M included is a linearly extending line segment, as an example. However, such a specific shape of the toner mark M should not be so limited.

Finally, the present invention is not limited to the specific features of the respective embodiments. Another combination with the use of other components/parts may be realized instead. As to these points, the respective embodiments may be changed within such a scope that the concept of the present invention is maintained, and a specific configuration may be appropriately determined according to a mode in which the present invention is actually applied.

The present invention is not limited to the specifically disclosed embodiments, and variations and modifications may be made without departing from the scope of the present invention.

The present application is based on Japanese priority applications Nos. 2008-042950 and 2009-011934, filed Feb. 25, 2008 and Jan. 22, 2009, respectively, the entire contents of which are hereby incorporated herein by reference.

DESCRIPTION OF REFERENCE NUMERALS

1 paper feeding tray
2 paper feeding roller
3 separating roller
4 paper sheet
5 conveyance belt
6BK, 6M, 6C, 6Y image forming part
7 driving roller
8 following roller
9BK, 9M, 9C, 9Y photosensitive drum
10BK, 10M, 10C, 10Y charger
11 exposure unit
12BK, 12M, 12C, 12Y developer
13BK, 13M, 13C, 13Y static eraser
14BK, 14M, 14C, 14Y laser light (exposure beam)
15BK, 15M, 15C, 15Y transfer unit
16 fixing unit
17*a*, 17*b*, 17*c* image detecting part (TM sensor)
21 light emitting part
22 slit
23*a*, 23*b*, 23*c* toner mark patterns
24 light receiving part
31 I/O port
32 CPU
33 RAM
34 ROM
35 bus
36 CD-ROM drive
36A CD-ROM
41 amplifier (AMP)
42 filter
43 A/D converter
44 sampling control part
45 FIFO memory
46 light emitting amount control part
50 control system (control part)
51 pattern forming part
52 pattern position detecting part (detecting part)
53 pattern misregistration amount calculating part (calculating part)
54 misregistration amount determination part (determination part)
55 correction timing control part (operation start control part)
56 misregistration correcting part (correcting part)
100 image forming apparatus
h height (height of a toner mark)
w width (width of a toner mark)
M toner mark
H opening
Pa performing determination patterns
Pb correction patterns

What is claimed is:

1. An image forming apparatus which carries out misregistration correction for image formed positions of a plurality of colors with the use of misregistration correction patterns, said image forming apparatus comprising:

a pattern forming part configured to form a pattern image of either misregistration correction patterns including a plurality of position detecting marks or misregistration correction performing determination patterns having a plurality of position detecting marks, the number of which marks is smaller than that of the misregistration correction patterns;

a misregistration amount calculating part configured to calculate a misregistration amount based on an image formed position detected with the use of the pattern image formed by the pattern forming part;

a correction performing determination part configured to determine whether misregistration correction is to be carried out, based on the misregistration amount calculated by the misregistration amount calculating part; and a correcting part configured to carry out misregistration correction based on a determination result of the correction performing determination part, wherein:

said correction performing determination part determines whether misregistration correction is to be carried out based on the misregistration amount calculated by the misregistration amount calculation part with the use of image formed positions of the misregistration correction performing determination patterns formed by the pattern forming part, and when the correction performing determination part has determined to carry out misregistration correction, the correcting part carries out misregistration correction based on the misregistration amount calculated by the misregistration amount collecting part with the use of image formed positions of the misregistration correcting patterns formed by the pattern forming part.

2. The image forming apparatus as claimed in claim 1, wherein:

the correction performing determination part compares the misregistration amount calculated by the misregistration amount calculating part based on an image formed position of the misregistration correction performing determination patterns with a previously set predetermined threshold, and determines to carry out misregistration correction when the misregistration amount is equal to or more than the predetermined threshold.

3. The image forming apparatus as claimed in claim 1, further comprising:

an operation start control part configured to control an operation start of misregistration correction according to an operating condition of the image forming apparatus, wherein:

when the operating condition is changed to any one of a state in which a plurality of pages of images are currently being formed and a state in which forming of a plurality of pages of images has already finished, the operation start control part gives a direction to the pattern forming part to form the misregistration correction performing determination patterns, and controls an operation start of misregistration correction.

4. The image forming apparatus as claimed in claim 1, wherein:

when receiving a direction to form the misregistration correction performing determining patterns, the pattern forming part forms patterns including at least one or more mark sequences, out of a plurality of mark sequences, each mark sequence of a plurality of mark sequences including a plurality of position detecting marks disposed in a line along a main scan direction.

5. The image forming apparatus as claimed in claim 1, wherein:

when receiving a direction to form the misregistration correction performing determining patterns, the pattern forming part forms patterns including mark sequences corresponding to respective colors, each mark sequence including a plurality of position detecting marks disposed in a line along a main scan direction.

6. The image forming apparatus as claimed in claim 1, wherein:

when receiving a direction to form the misregistration correction performing determining patterns, the pattern forming part forms patterns including mark sequences corresponding to two colors which include a reference color used when misregistration correction is carried out and a predetermined one color other than the reference color, each mark sequence including a plurality of position detecting marks disposed in a line along a main scan direction.

7. The image forming apparatus as claimed in claim 1, wherein:

when receiving a direction to form the misregistration correction performing determining patterns, the pattern forming part forms patterns including mark sequences corresponding to a reference color used when misregistration correction is carried out and a predetermined plurality of colors other than the reference color, and each mark sequence includes a plurality of position detecting marks disposed in a line along a main scan direction, the number of the mark sequences being smaller than the number of mark sequences included in the misregistration correction patterns.

8. The image forming apparatus as claimed in claim 1, wherein:

when receiving a direction to form the misregistration correction performing determining patterns, the pattern forming part forms patterns including mark sequences corresponding to a reference color used when misregistration correction is carried out and a predetermined plurality of colors other than the reference color, and each mark sequence includes a plurality of position detecting marks disposed in a line along a main scan direction, the mark sequences being disposed in such a manner that marks included in the mark sequences are overlaid together.

9. The image forming apparatus as claimed in claim 1, wherein:

when receiving a direction to form the misregistration correction performing determining patterns, the pattern forming part forms patterns including mark sequences, each mark sequence including a plurality of position detecting marks disposed in a line along a main scan direction, the plurality of position detecting marks being different in their lengths of one sides.

10. The image forming apparatus as claimed in claim 1, wherein:

the pattern forming part forms patterns which include a mark sequence of a color for which the correction performing determination part determines to carry out correction, out of a plurality of mark sequences which include position detecting marks disposed along a main scan direction, included in the misregistration correction patterns.

11. The image forming apparatus as claimed in claim 1, wherein:

the pattern forming part forms patterns which include a mark sequence including marks having lengths shorter than those of the position detecting marks of the misregistration correction patterns.

12. A misregistration correction control method in an image forming apparatus which carries out misregistration correction for image formed positions of a plurality of colors with the use of misregistration correction patterns, said misregistration correction control method comprising:

a pattern forming step of forming a pattern image of either misregistration correction patterns including a plurality of position detecting marks or misregistration correction performing determination patterns having a plurality of position detecting marks, the number of which marks is smaller than that of the misregistration correction pattern image;

a misregistration amount calculating step of calculating a misregistration amount based on an image formed position detected with the use of the pattern image formed in the pattern forming step;

a correction performing determination step of determining whether misregistration correction is to be carried out, based on the misregistration amount calculated in the misregistration amount calculating step with the use of image formed positions of the misregistration correction performing determination patterns formed in the pattern forming step; and a correcting step of, when it is determined in the correction performing determination step to carry out misregistration correction, carrying out misregistration correction based on the misregistration amount calculated in the misregistration amount calculating step with the use of image formed positions of the misregistration correction patterns formed in the pattern forming step.

13. The misregistration correction control method as claimed in claim 12, wherein:

in the correction performing determination step, the misregistration amount calculated in the misregistration amount calculating step based on an image formed position of the misregistration correction performing determination patterns is compared with a previously set predetermined threshold, and it is determined to carry out misregistration correction when the misregistration amount is equal to or more than the predetermined threshold.

14. The misregistration correction control method as claimed in claim 12, further comprising:

an operation start control step of controlling an operation start of misregistration correction according to an operating condition of the image forming apparatus, wherein:

in the operation start control step, when the operating condition is changed to any one of a state in which a plurality of pages of images are currently being formed and a state in which forming of a plurality of pages of images has already been finished, the misregistration correction performing determination patterns are formed in the pattern forming step, and an operation start of misregistration correction is controlled.

15. The misregistration correction control method as claimed in claim 12, wherein:

in the pattern forming part, when the misregistration correction performing determining patterns are to be formed, patterns including at least one or more mark sequences, out of a plurality of mark sequences, is formed, each of the plurality of mark sequence including a plurality of position detecting marks disposed in a line along a main scan direction.

16. The misregistration correction control method as claimed in claim 12, wherein:

in the pattern forming part, when the misregistration correction performing determining patterns are to be formed, patterns including mark sequences corresponding to respective colors are formed, each mark sequence including a plurality of position detecting marks disposed in a line along a main scan direction.

17. The misregistration correction control method as claimed in claim 12, wherein:

in the pattern forming step, patterns are formed which include a mark sequence of a color for which it is determined in the correction performing determination step to carry out correction, out of a plurality of mark sequences which include position detecting marks disposed along a main scan direction, included in the misregistration correction patterns.

18. A non-transitory computer-readable information recording medium embodying a misregistration correction control program which, when executed by a computer processor, performs a misregistration correction control method in an image forming apparatus which carries out misregistration correction for image formed positions of a plurality of colors, with the use of misregistration correction patterns, said misregistration correction control method comprising:

a pattern forming step of forming a pattern image of either misregistration correction patterns including a plurality of position detecting marks or misregistration correction performing determination patterns having a plurality of position detecting marks, the number of which marks is smaller than that of the registration correction patterns;

a misregistration amount calculating step of calculating a misregistration amount based on an image formed position detected with the use of the pattern image formed in the pattern forming step;

a correction performing determination step of determining whether misregistration correction is to be carried out, based on the misregistration amount calculated in the misregistration amount calculating step with the use of an image formed position of the correction performing determination patterns formed in the pattern forming step; and a correcting step of, when it is determined in the correction performing determination step to carry out the misregistration correction, carrying out the misregistration correction based on the misregistration amount calculated in the misregistration amount calculating step with the use of image formed positions of the misregistration correction patterns formed in the pattern forming step.

* * * * *